(12) United States Patent
Yamaguchi et al.

(10) Patent No.: US 8,727,503 B2
(45) Date of Patent: May 20, 2014

(54) LIQUID JET RECORDING HEAD AND MANUFACTURING METHOD THEREOF

(75) Inventors: Yukuo Yamaguchi, Tokyo (JP); Satoshi Kimura, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/543,182

(22) Filed: Jul. 6, 2012

(65) Prior Publication Data

US 2013/0002765 A1  Jan. 3, 2013

Related U.S. Application Data

(63) Continuation of application No. 12/652,672, filed on Jan. 5, 2010, now Pat. No. 8,388,114.

(30) Foreign Application Priority Data

Jan. 7, 2009 (JP) .................................. 2009-001494

(51) Int. Cl.
  *B41J 2/05* (2006.01)
(52) U.S. Cl.
  USPC .......................................................... 347/66
(58) Field of Classification Search
  USPC .................................... 347/20, 65, 66, 84–85
  See application file for complete search history.

(56) References Cited

U.S. PATENT DOCUMENTS

| | | | | |
|---|---|---|---|---|
| 5,699,095 A | * | 12/1997 | Mitsuzawa et al. | 347/92 |
| 5,969,738 A | * | 10/1999 | Tomikawa et al. | 347/86 |
| 6,634,738 B1 | * | 10/2003 | Shinada et al. | 347/86 |
| 6,692,118 B2 | * | 2/2004 | Michele et al. | 347/86 |
| 7,556,366 B2 | * | 7/2009 | Kudo et al. | 347/86 |
| 8,388,114 B2 | * | 3/2013 | Yamaguchi et al. | 347/66 |

FOREIGN PATENT DOCUMENTS

| | | |
|---|---|---|
| JP | 62-087315 A | 4/1987 |
| JP | 2001-246764 A | 9/2001 |
| JP | 2002-273882 A | 9/2002 |
| JP | 2004-230881 A | 8/2004 |

* cited by examiner

*Primary Examiner* — Anh T. N. Vo
(74) *Attorney, Agent, or Firm* — Canon USA Inc IP Division

(57) ABSTRACT

A primary flow path forming member is provided with a groove which becomes a recording liquid supply path on a bottom surface thereof. A second flow path forming member is provided with an arm portion. The arm portion of the second flow path forming member is used as a cap for closing the opening of the groove which becomes the liquid supply path formed on the bottom surface of the prime flow path forming member. The primary flow path forming member and the second flow path forming member as described above are formed by injection-molding and bonded with each other by a bonding member. The bonding member is formed to cover a portion where the opening edge of the groove which becomes the recording liquid supply path, in the primary flow path forming member abuts on the arm portion of the second flow path forming member.

3 Claims, 30 Drawing Sheets

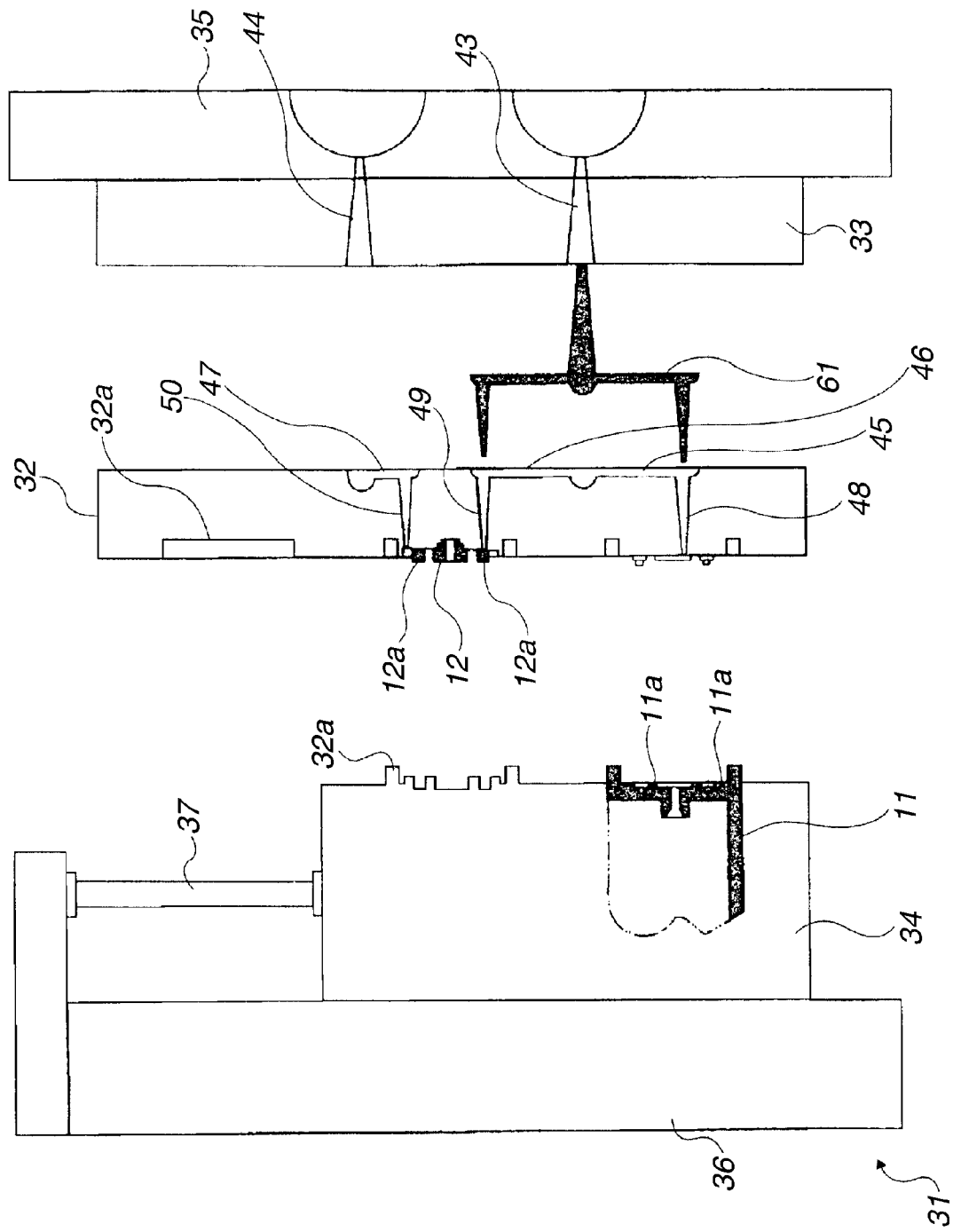

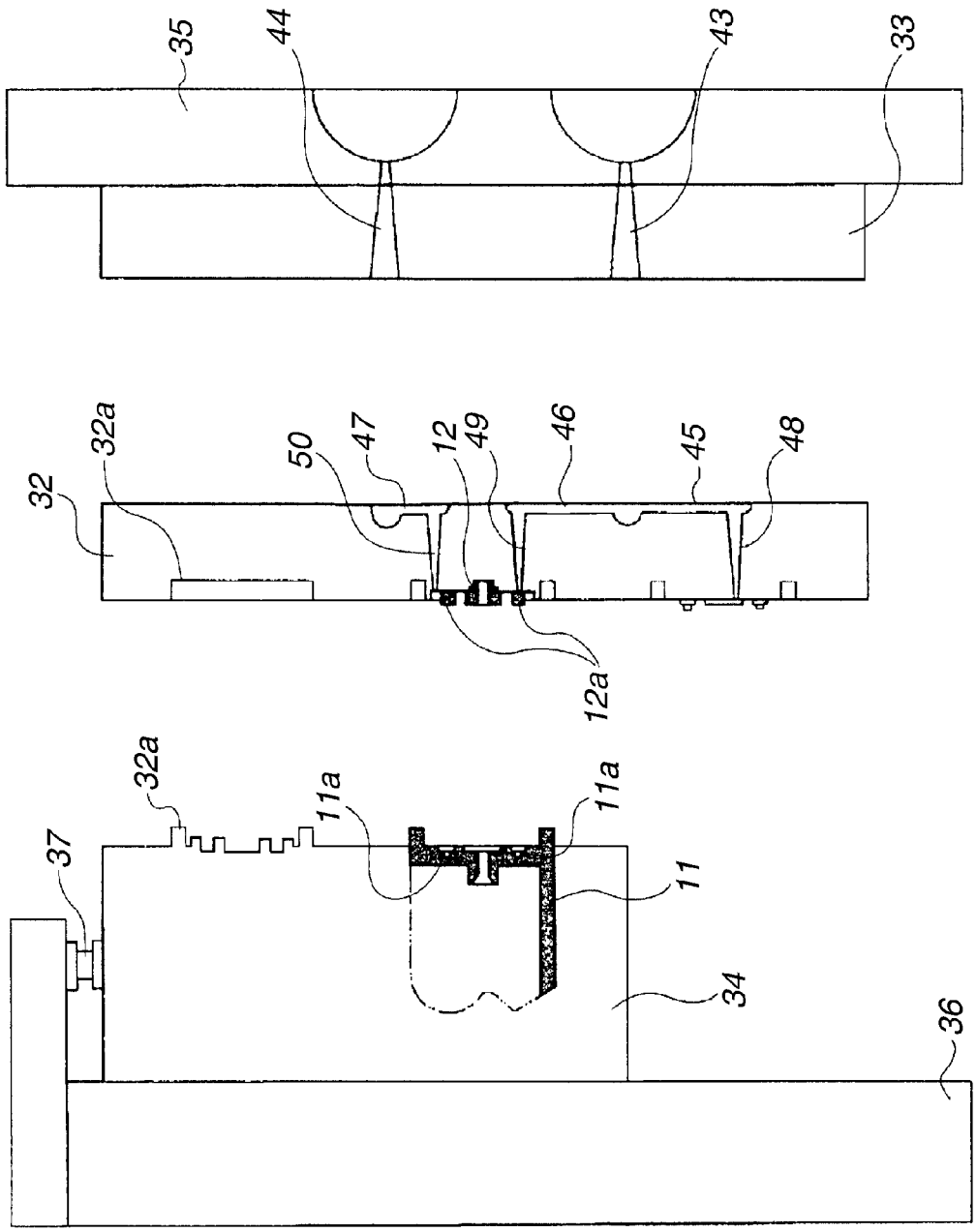

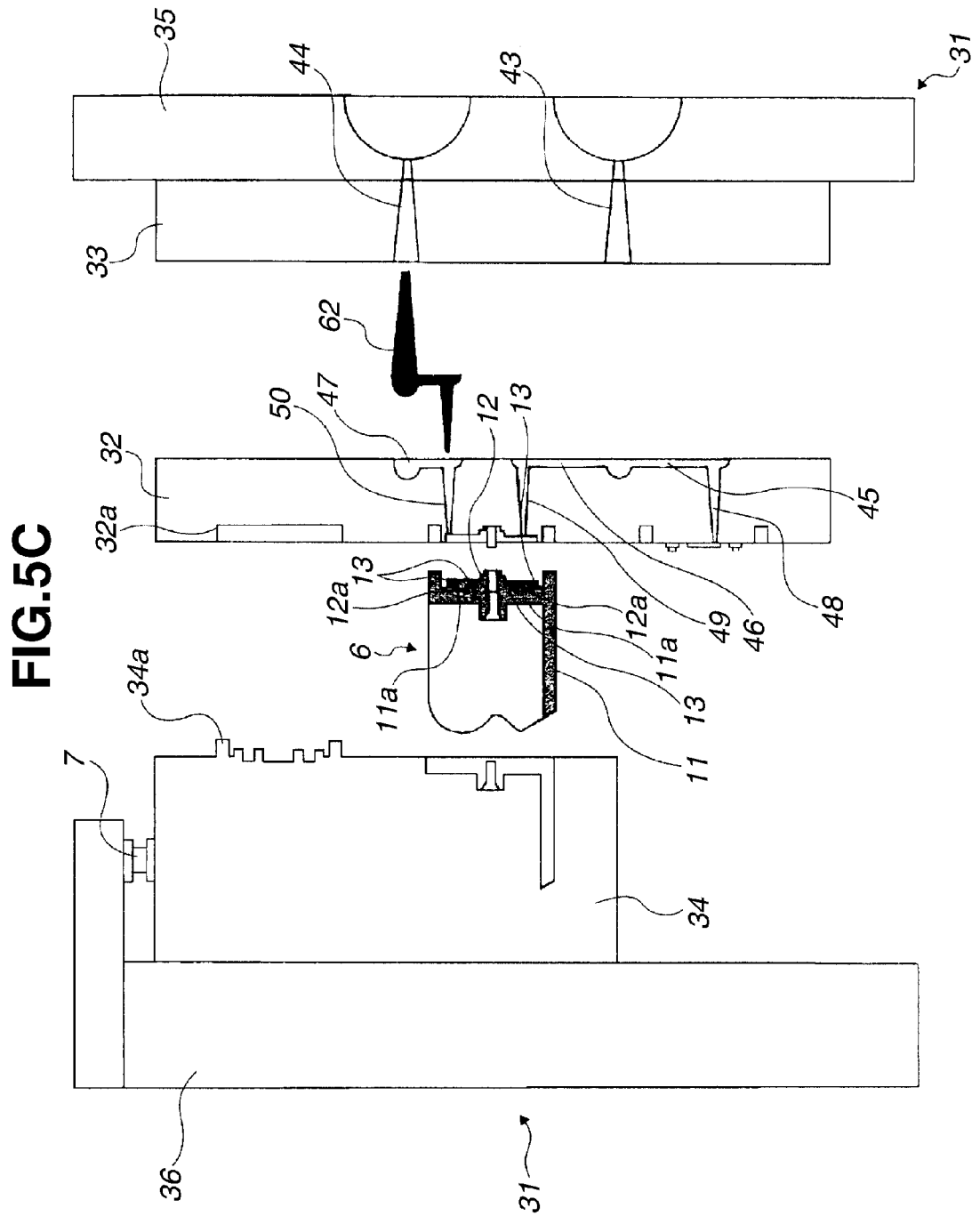

LIQUID JET RECORDING HEAD AND MANUFACTURING METHOD THEREOF

CROSS REFERENCE TO RELATED APPLICATIONS

The present application is a continuation of U.S. patent application Ser. No. 12/652,672, filed on Jan. 5, 2010, the content of which is expressly incorporated by reference herein in its entirety. This application also claims the benefit of Japanese Application No. 2009-001494 filed Jan. 7, 2009, which is hereby incorporated by reference herein in its entirety.

BACKGROUND OF THE INVENTION

1. Field of the Invention

The present invention relates to a liquid jet recording head which performs recording by jetting droplets such as recording liquid from a discharge port to a recording medium such as paper and cloth, and a liquid jet recording apparatus which uses the liquid jet recording head, or a manufacturing method of the liquid jet recording head.

2. Description of the Related Art

Such a liquid jet recording apparatus features a recording head which can be easily decreased in size. Further, the apparatus can record a highly fined image at high speed and can decrease running costs and reduce noise since the apparatus is a non impact-printer. Furthermore, the apparatus has many advantages, for example, the apparatus can easily record a color image by using multicolor recording liquid.

The liquid jet recording head includes a recording head which forms the droplets, and a recording liquid supply unit which supplies the recording liquid to the recording head. The apparatus has two types of structures. In one type, a recording liquid storage tank can be exchanged separate from the recording head and in another one the recording head is integrated with the recording liquid storage tank.

A conventional recording head structure of the recording liquid storage tank exchange type will be described.

FIGS. 16A and 16B are perspective views illustrating a recording liquid storage tank mounted on the recording head. FIG. 16C is an exploded perspective view illustrating a periphery of the recording head.

The liquid jet recording head (recording head cartridge H1000) illustrated in FIGS. 16A and 16B includes an ink tank H1900 and a recording head H1001. The ink tank H1900 is detachably held by and secured to the recording head H1001 (Japanese Patent Application Laid-Open No. 2007-283668).

Further, the recording head H1001 holds the ink tank H1900 and a recording element unit H1002 including a recording element substrate H1100 which discharges ink drops by a discharge energy generating element such as an electric thermal conversion element. The recording head h1001 includes a holder unit H1003 which forms an ink flow path for supplying ink to the recording element unit H1002.

FIG. 16C is an exploded perspective view illustrating the recording head H1001. The holder unit H1003 includes a holder H1500 and a flow path forming member H1600, both of which are bonded with each other to, for example, form six flow paths for supplying ink from six ink tanks H1900 to the recording element unit H1002. Ultrasonic wave welding is adopted as a method for bonding the both of the holder H1500 and the flow path forming member H1600. As discussed in U.S. Pat. No. 5,969,738, adhesive may also be used for bonding.

A structure of welding sections is illustrated in FIGS. 17A, 17B, 17C, and 17D. FIG. 17A illustrates a welding surface at a side of the flow path forming member, and FIG. 17B illustrates a welding surface at a side of the holder. FIGS. 17C and 17D are cross sectional views taken along line A-A in FIGS. 17A and 17B. FIG. 17C illustrates a state before welding is performed, and FIG. 17D illustrates the state after welding is performed.

As illustrated in the Figures, energy directors H1602 are provided at both sides of a groove, which is to be an ink flow path H1601. The holder H1500 (container holding member) and the flow path forming member H1600 bonded with each other by the ultrasonic wave welding to complete the ink flow path H1601. Generally, when the ultrasonic wave welding is performed, the energy director is formed on a surface of one of two bonding sections and a clearance groove H1502 for the welding section is formed on a surface of the other one of the two bonding sections so that the base surfaces of the both bonding sections can be in close contact with each other when the ultrasonic wave welding is performed.

If a bubble is generated in or mixed into the recording liquid flowing in a recording liquid supply path of the liquid jet recording head having the structure described above, the droplets are not discharged or unstably discharged. Further, a plurality of flow paths connected to discharge ports has a common liquid chamber at an upper stream side. If the above-described bubbles gather in the common liquid chamber and stay there to grow into a large bubble, defective supplying of the recording liquid can occur. Furthermore, if the defective supplying worsens and spreads in a wide range, the droplets cannot be discharged. As to why the bubble is generated or mixed into the recording liquid, following reasons are conceivable.

1) In order to prevent the recording liquid from leaking out of the discharge port, a negative pressure is maintained in the common liquid chamber at the upper stream side of the discharge port and in the recording liquid supply path. Due to the negative pressure, the air comes through a connection section of the recording liquid supply paths or a minute aperture appearing at a connection section of the common liquid chamber and the recording liquid supply path to become the bubble.

2) The air comes through a member forming the recording liquid supply path or the common liquid chamber, a sealing member connecting between the members, or the adhesive and the sealant to become the bubble.

3) Gas remaining in the a member forming the recording liquid supply path or the common liquid chamber, a sealing member connecting between the members, or the adhesive and the sealant becomes the bubble.

4) Gas remaining melted in the recording liquid generates a bubble along with increase of temperature or decrease of pressure.

5) When the recording liquid is supplied from the recording liquid storage container to the recording head, the bubble is mixed into the recording liquid.

If the above-described bubble stays in the recording liquid supply path or the common liquid chamber, the bubble obtains a ball shape due to a nature of the bubble to keep a surface area thereof small. Accordingly, the more round a cross section of the recording liquid supply path is, the more the supply of the recoding liquid is obstructed. If the recording liquid is hindered from being supplied, eventually the droplet is not discharged due to defective supplying of the recording liquid. Further, even if the droplet is not completely obstructed by the bubble, in a recording mode in which a large amount of recording liquid needs to be supplied, defective discharging of the droplet can occur in a wide range.

Three cases of the conventional structures will be introduced and each of the problems will be described as follows.

In a first case, the flow path forming member and the container holding member are bonded by the ultrasonic wave vibration welding method as discussed in Japanese Patent Application Laid-Open No. 2007-283668. Such a case includes following problems.

1) Due to fusion bonding of two members (liquid path forming member and container holding member), fused resin can get into the recording liquid supply path to form a burr shape and protrusion therein.

2) Further, the protruding resin in a burr shape comes off due to ultrasonic wave vibration and becomes broken pieces, which can scatter in the recording liquid supply path.

3) After the two members are bonded with each other, an inside of the recording liquid supply path needs to be cleaned to remove the burr and the broken pieces.

4) To decrease the protruding of the fused resin, between a raised portion serving as the bonding section of the two members and also as the energy director, and an recessed portion used as the clearance groove into which the raised portion is inserted, avoid for containing the fused resin needs to be provided.

5) Since the bubble stays in the void, suction recovery is necessary to remove the staying bubble.

6) A high accuracy of flatness is required of both bonding surfaces of the flow path forming member and the container holding member.

A second case discussed in U.S. Pat. No. 5,969,738 will be described.

The recording liquid supply path discussed in U.S. Pat. No. 5,969,738 has a structure in which a lower portion of the recording liquid supply path has a flat shape and an upper portion has a curved shape of an arc shape as illustrated in FIGS. 18A, 18B, 18C, and 18D, and FIGS. 19A, 19B, 19C, and 19D. This case having the structure described above has the problems described below.

1) If the upper portion of the supply path is formed in an arc shape, a cross-section area of the flow path becomes small, which gives the structure a disadvantage in decreasing size of the recording head.

2) Since recording liquid supply path has the structure in which a circular arc portion 2001 and a flat surface portion 2003 are bonded with each other with adhesive 2004, a void portion 2002 for containing the adhesive 2004 is necessary therebetween.

3) Since a bubble "X" stays in the recessed portion of the void portion 2002 at the lower portion of the flow path, the suction recovery is necessary to remove the bubble.

4) If the structure does not include the void portion 2002, the adhesive 2004 gets into the flow path when the circular arc portion 2001 is bonded with the flat surface portion 2003. Accordingly, the cross-section areas of the flow paths of a plurality of products cannot have a uniform shape.

5) If the adhesive 2004 comes out, wettability inside the flow path cannot be uniform, thus deteriorating a performance in supplying the recording liquid.

6) Since a wall between the adjacent flow paths is formed to have an nonuniform thickness such that the wall becomes thicker toward the upper portion of the flow path, a sink mark can occur when the member is injection molded, thereby deteriorating a dimension accuracy.

7) The high accuracy of the flatness is required of bonding surfaces of the member having the circular arc portion 2001 and the member having the flat surface portion 2003.

The void portion between the above-described arc portion and the flat surface portion is a space having a large flow resistance since the void portion is minute and formed as a recessed portion at a corner of the cross section of the flow path. Further, this void portion exists over a wide range in a direction of a length of the recording liquid supply path.

Therefore, when the recording liquid fills the recording liquid supply path, the bubble tends to remain in this space. The remaining bubble merges with the bubble "X" which is later generated, to grow into a large bubble. Since the bubble remaining in the recording liquid supply path prevents supply of the recording liquid, the bubble needs to be removed as much as possible.

A third case describes a structure in which the container holding member is bonded with the flow path forming member by a laser welding method. This structure has problems described as below.

1) If the flow path portion is irradiated with laser beam, a surface of the flow path is fused, which makes the surface of the flow path coarse. Thus, the flow resistance of the recording liquid is increased to disturb the flow of the recording liquid. Accordingly, widths of the bonding surfaces of the two members need to be set larger than a width of the laser beam to prevent the laser beam from falling onto the surface of the flow path.

2) A change of a thickness of a member at a laser transmission (flow path forming member) side affects a distribution of a laser transmission rate. More specifically, a region having a thick member decreases the laser transmission rate compared to a region having a thin member, thereby decreasing a welding strength.

3) If an obstacle such as a rib, projection, and slope is disposed on the flow path forming member, the laser beam reflects on the obstacle or is refracted. Thus, the distribution of energy of the laser irradiation is deteriorated, and a desired welding strength cannot be obtained.

4) A high accuracy of flatness is required of bonding surfaces of the flow path forming member and the container holding member. If a large curve or a large sink mark is generated on the bonding surfaces, adhesiveness between the container holding member and the flow path forming member is deteriorated.

A material having a large laser transmission rate needs to be selected.

As described in the above three conventional cases, the bubble remaining in the recording liquid supply path may disturb the recording liquid to be supplied. Further, if the bubble grows into a larger bubble, the flow of the recording liquid is disturbed. The recording liquid is not sufficiently supplied into a nozzle, so that the droplet is not discharged.

When the fusion bonding generates the protrusion or a burr into the recording liquid supply path, similarly to the bubble, the protrusion or the burr disturbs the recording liquid to be supplied and causes the droplet not to be discharged. To prevent the droplet from failing to be discharged, the suction recovery processing is necessary. Further, in the laser welding method, changing the thickness of the member and providing the protrusion and the slope that may disturb the laser transmission are restricted.

SUMMARY OF THE INVENTION

The present invention is directed to preventing a droplet from failing to be discharged even if a bubble gets into a recording liquid supply path.

The present invention is further directed to providing a structure in which a shape of a cross section of the recording liquid supply path is simplified so that the bubble hardly stays in the recording liquid supply path. More specifically, the present invention is directed to providing a structure in which no void for containing adhesive and fused resin is provided at a bonding section between two members forming the recording liquid supply path.

Further, the present invention is directed to providing a structure in which a cross section over a whole region of the recording liquid supply path has a substantially same shape and a manufacturing method thereof.

Furthermore, the present invention is directed to decreasing a recording head in size, realizing both of preventing the bubble from getting into the recording liquid supply path, and securing a cross-section area of the recording liquid supply path.

According to an aspect of the present invention, a liquid jet recording head provided with a recording liquid storage container that stores recording liquid and a recording liquid supply path that supplies the recording liquid from the recording liquid storage container to a recording liquid discharge unit that discharges the recoding liquid includes a primary flow path forming member provided with a groove which becomes the recording liquid supply path on a primary surface thereof, a second flow path forming member configured to face the groove and close an opening of the groove serving as a cap, and a binding section configured to bind the primary flow path forming member and the second flow path forming member. The second flow path forming member abuts on an opening edge of the groove of the primary flow path forming member to form the recording liquid supply path. The second flow path forming member is formed in a shape along an outline of the groove and a width of the second flow path forming member is larger than a width of the opening of the groove. The binding section is formed in a periphery of the primary flow path forming member and the second flow path forming member.

According to an aspect of the present invention, a method for manufacturing the liquid jet recording head includes simultaneously injection-molding the primary flow path forming member and the second flow path forming member by a plurality of cavities in the same mold, relatively sliding both members such that the groove in the molded primary flow path forming member faces the second flow path forming member having a shape formed along the outline of the groove, clamping and separate-member-abutting of the opening edge of the groove of the primary flow path forming member, and the second flow path forming member, and injection-molding resin into a periphery of the primary flow path forming member and the second flow path forming member to form a bonding section.

According to the present invention, a void portion is not provided at a bonding section between two members which forms the recording liquid supply path, and thus bubbles staying in the recording liquid supply path is decreased to smoothly supply the recording liquid. Accordingly, an easy suction operation and suction processing with low frequency can be sufficiently performed as an operation of suction recovery for removing the bubbles.

Further, the following arrangements can decrease a size of the recording head by decreasing a distance between the adjacent flow paths.

1) The flow path forming member which is one of the members for closing an opening of a groom formed by another one of the members to form the recording liquid supply path is formed in a minimum smallest shape along with an outline of the recording liquid supply path.

2) The void portion for containing a sealing material which bonds two members (i.e., the flow path forming member and the container holding member) to form the recording liquid supply path does not need to be provided.

3) The region of the bonding section can be formed small.

4) Since the cross section of the recording liquid supply path has a substantially-rectangular shape, the large cross-section area of the flow path can be secured.

BRIEF DESCRIPTION OF THE DRAWINGS

The accompanying drawings, which are incorporated in and constitute a part of the specification, illustrate exemplary embodiments of the invention and, together with the description, serve to explain the principles of the invention.

Further features and aspects of the present invention will become apparent from the following detailed description of exemplary embodiments with reference to the attached drawings, in which like reference characters designate the same or similar parts throughout the figures thereof.

FIGS. 4A and 4B are cross-sectional views illustrating an mold opening operation and an operation of a sliding process of a mold plate at a movable side.

FIGS. 5A, 5B, and 5C are cross-sectional views illustrating an operation for closing the mold before the primary injection mold is performed, an operation of a second injection molding process and an operation for opening the mold and an operation for removing a molded product of the flow path forming member after the second injection mold is performed.

DETAILED DESCRIPTION OF THE EMBODIMENTS

Various exemplary embodiments, features, and aspects of the invention will be described in detail below with reference to the drawings.

Figure 1A:
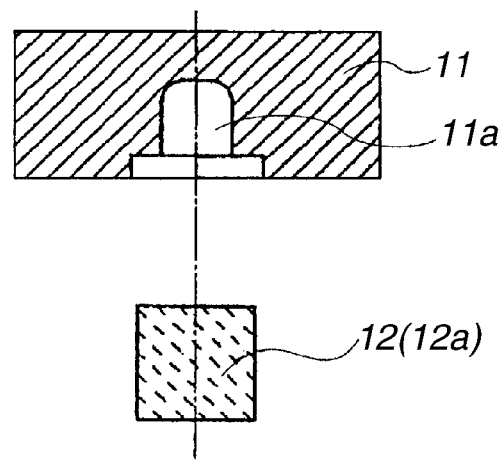
FIGS. 1A, 1B, and 1C are partial cross-sectional views of a vicinity of a recording liquid flow path illustrating two members forming a recording liquid supply path in a liquid jet recording head and a state in which the two members are bonded with each other according to the present invention.
Figure 1B:
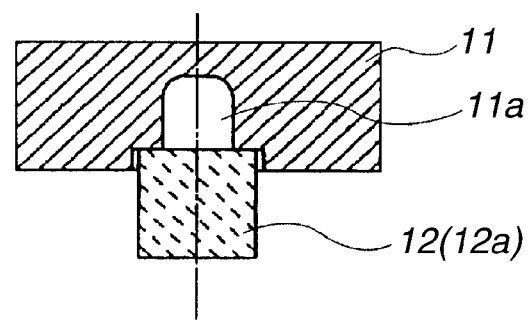
Figure 1C:
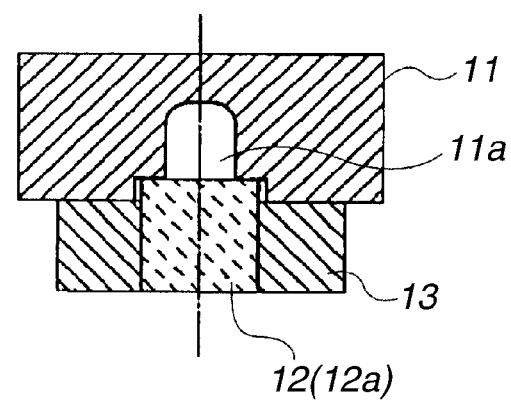
Figure 2A:
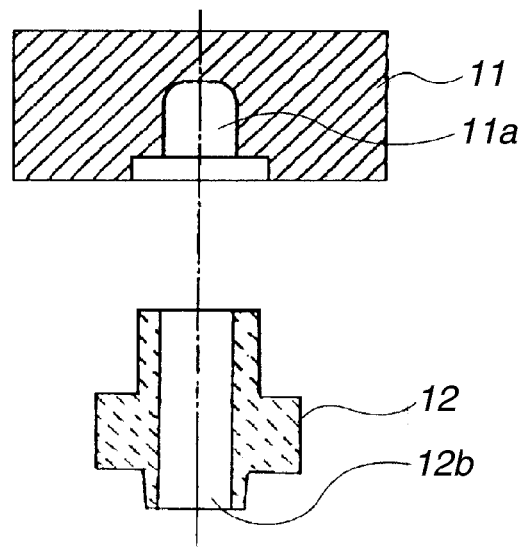
FIGS. 2A, 2B, and 2C are partial cross-sectional views of a vicinity of a outlet port illustrating two members forming the recording liquid supply path in the liquid jet recording head and a state in which the both members are bonded with each other according to the present invention.
Figure 2B:
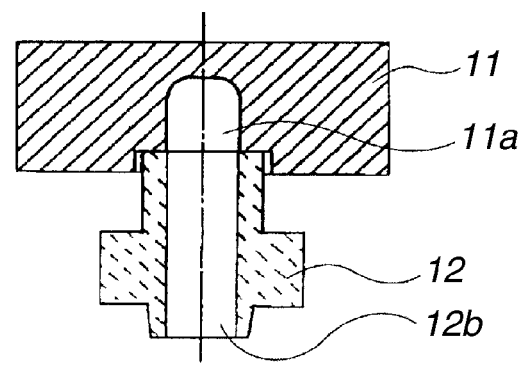
Figure 2C:
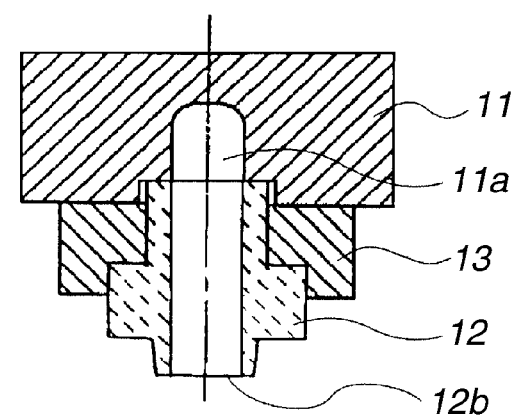

FIGS. 1A, 1B, and 1C are cross-sectional views illustrating a half way supply path in an example of a structure of a recording liquid supply path in a liquid jet recording head according to the present invention. FIGS. 2A, 2B, and 2C are cross-sectional views illustrating an outlet port of the supply path in the example of the structure of the recording liquid supply path, which is the same example as those in FIGS. 1A, 1B, and 1C.

As illustrated in FIGS. 1A, 1B, and 1C and FIGS. 2A, 2B, and 2C, a recording liquid supply path 11a is formed by bonding a primary flow path forming member 11 and a second flow path forming member 12. The second flow path forming member 12 is bonded to the primary flow path forming member 11 with a bonding member 13. The second flow path forming member 12 is provided with a 12b for leading the recording liquid to a recording element substrate side as illustrated in FIG. 4A.

More specifically, there is provided a groove which becomes a path of the recording liquid on a surface of the first flow path forming member 11 onto which the second flow path forming member 12 is to be bonded. As a cap for preventing the groove from opening, the second flow path forming member 12 is formed along with the groove of the primary flow path forming member 11.

When the groove of the primary flow path forming member 11 is capped with the second flow path forming member 12, a path is formed into a tunnel shape. The path becomes the recording liquid supply path 11a. The bonding member 13 securely bonds the second flow path forming member 12 onto the primary flow path forming member 11 serving as the cap which closes an opening portion of the groove of the primary flow path forming member 11.

A cross-sectional face of the flow path of the formed recording liquid supply path 11a has a substantially-rectangular shape. When the liquid jet recording head is used and mounted on a body of the recording apparatus, the recording liquid supply path 11a is extended in a direction orthogonal to a gravity direction.

When the recording liquid supply path has the cross section of the flow path in a substantially-rectangular shape, a generated bubble comes up, gets stuck on a top ceiling, and stays there. Therefore, a corner portion of the ceiling surface (upper surface in FIG. 1) of the recording liquid supply path 11a is formed in a round (R) shape or a curved shape.

The cross section of the flow path in the recording liquid supply path 11a is formed in a substantially same shape in a direction in which the recording liquid supply path 11a is extended. Thus, even if the bubble generated in the recording liquid supply path 11a comes up, the bubble does not get stuck nor stay at the corner portion. Further, since the cross section is formed in the substantially same shape over a wide range in a length direction of the flow path, a resistance fluctuation of a flow is small in the recording liquid supply path, thereby stably supplying the recording liquid.

The shape of the corner portion is not limited to a curved shape, but a chamfered corner can also provide a similar effect.

Further, since a void portion such as a recessed portion does not appear at the bonding section of the recording liquid supply path formed of two flow path forming members owing to its structure, the bubble does not stay, and thus the recording liquid can smoothly flow down a stream. Accordingly, suction recovery for removing the bubbles can be carried out with the simple suction operation and the suction processing, which are sufficiently performed with low frequency. Furthermore, an amount of discharged recording liquid to be used for one process of the suction recovery can be greatly decreased.

Followings are a method for manufacturing the liquid jet recording head of the present invention, particularly, a method for manufacturing a structure (e.g., the recording liquid supply unit 6 illustrated in FIGS. 8A and 8B) including the recording liquid supply path 11a formed of the above-described primary flow path forming member 11 and second flow path forming member 12. A process for manufacturing the recording liquid supply unit 6 is illustrated in FIGS. 3A, 3B, 4A, 4B, 5A, 5B and 5C.

Figure 3A:
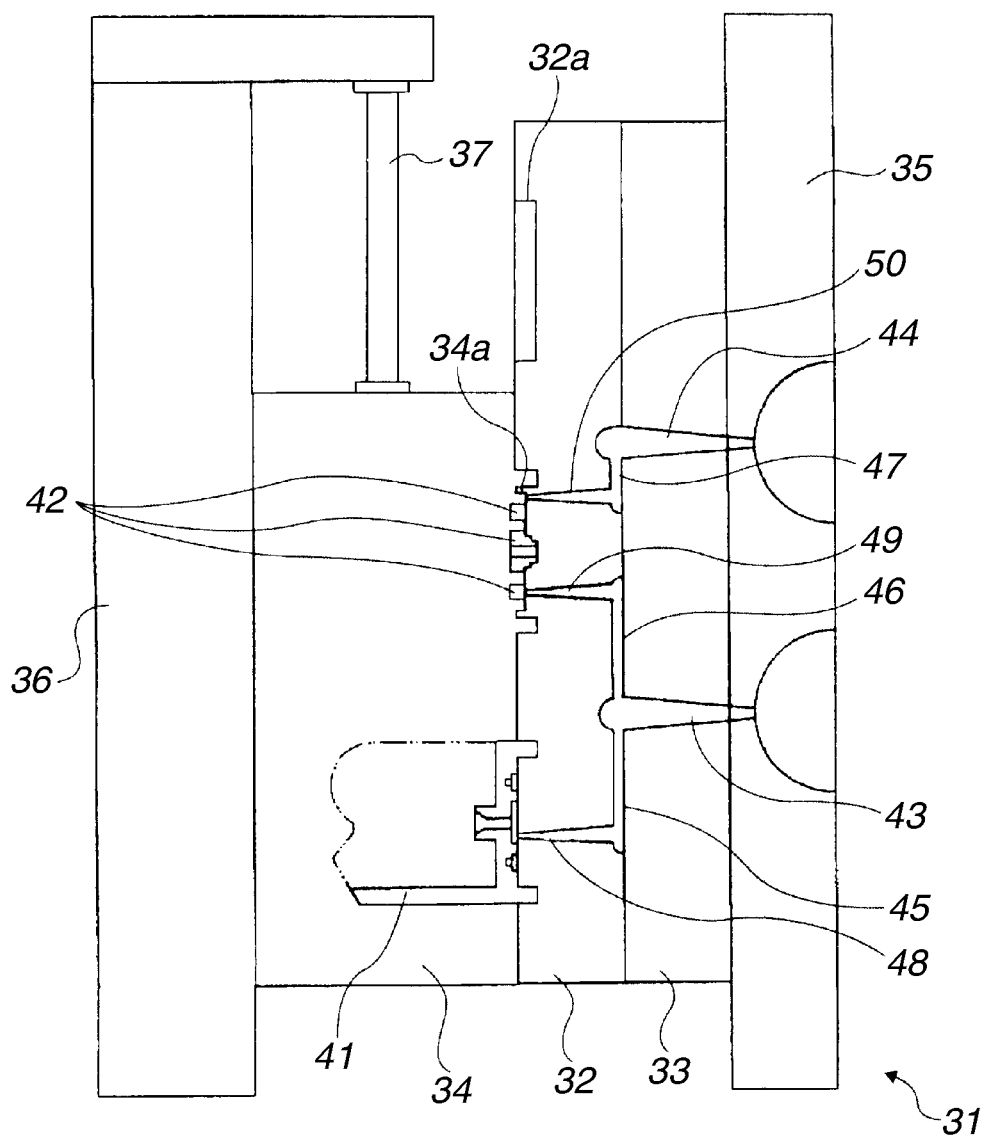
FIGS. 3A and 3B are cross-sectional views illustrating an operation of a primary injection molding process performed by an injection mold for manufacturing a recording liquid supply unit in the liquid jet recording head according to the present invention.

FIG. 3A is a schematic diagram (in which a mold is closed) illustrating one example of a die set of a mold for injection-molding the recording liquid supply unit 6.

In this diagram, a mold 31 includes a runner plate 32, a mold plate 33 at the fixed side, a mold plate 34 at the movable side, an attachment plate 35 at the fixed side, and an attachment plate 36 at the movable side.

The mold plate 34 at the movable side is slidable along an axial direction of a guide axis 37. The mold plate 34 at the movable side is transported and controlled by a driving unit including a cylinder and a motor of hydraulic, electric, or pneumatic type (not illustrated).

The mold plate 34 at the movable side is formed with a primary cavity 41 which injection-molds the primary flow path forming member 11 and a second cavity 42 which injection-molds the second flow path forming member 12.

The runner plate 32 is provided with a sprues 43 and 44 which guide fused resin. The primary sprue 43 is a primary sprue for guiding a primary injection-molded fused resin, and the second sprue 44 is a second sprue for guiding a second injection molding fused resin.

In the runner plate 32, runners 45 and 46 are diverged and formed in a downstream side of the primary sprue 43. The primary runner 45 is a runner heading for the primary cavity 41 and the second runner 46 is a runner heading for the second cavity 42.

Further, a primary gate 48 for injecting the fused resin into the primary cavity 41 is disposed in the downstream side of the primary runner 45. Similarly, a second gate 49 for injecting the fused resin into the second cavity 42 is disposed in the downstream side of the second runner 46.

Furthermore, in the runner plate 32, a third runner 47 is disposed in a downstream side of the second sprue 44, and a third gate 50 is disposed in a downstream side of the third runner 47. A core (raised portion) 34a of the mold plate 34 at the movable side faces and abut on an end of the third gate 50, thus the end of the gate is closed.

Figure 3B:
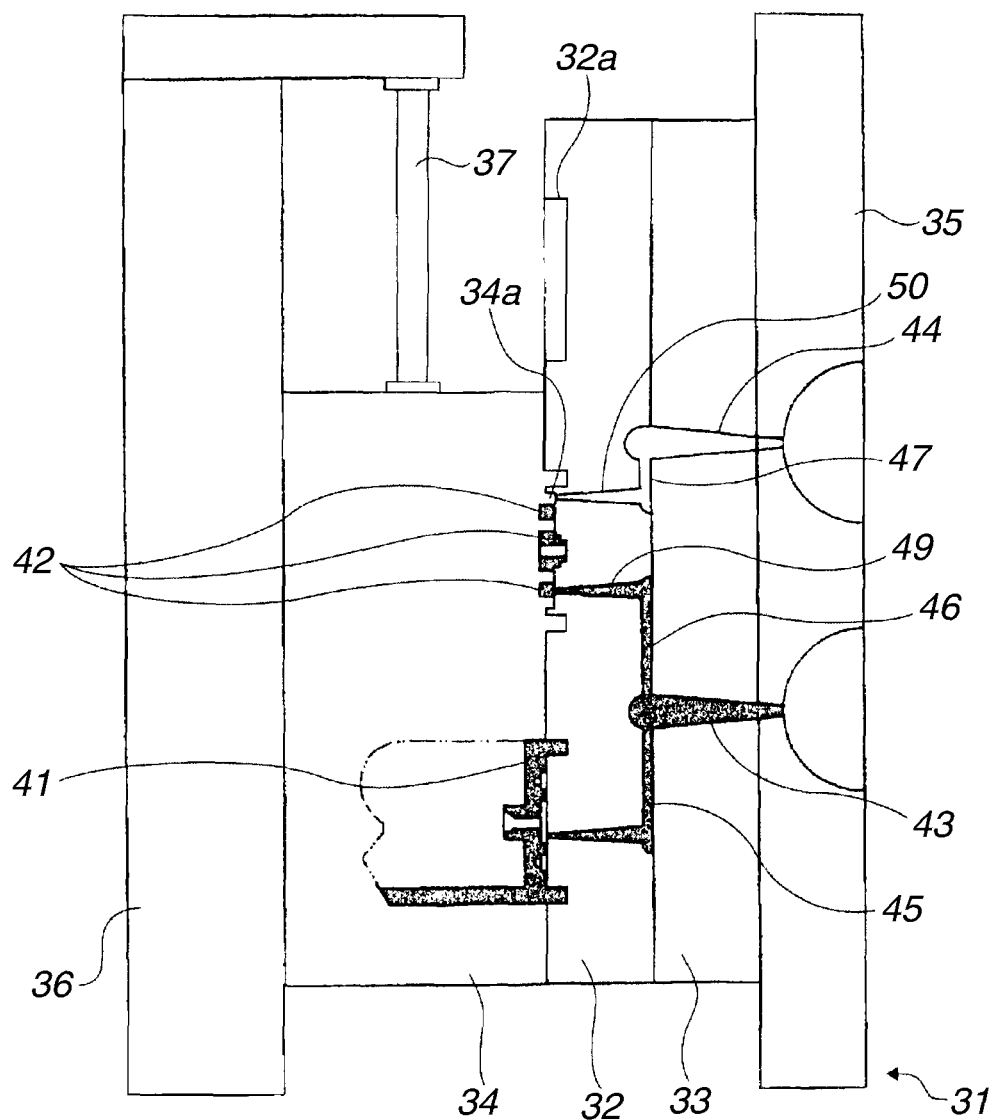

An injection molding process of the recording liquid supply unit 6 will be described in sequence from FIG. 3B below. According to the present embodiment, each of the primary injection molding and the second injection molding is molded with the same resin material respectively by an individual injection device, however can be molded by a single injection device.

When the single injection device is used, the same resin material is molded. Thus, when different materials are used for the primary and second injection moldings, injection devices having a plurality of cylinders (two or more) are used.

When the fused resin is injected from the injection device (not illustrated) to the primary sprue 43, the fused resin which has passed through the primary sprue 43 is separated into the primary runner 45 and the second runner 46. When the fused resin which has passed through the primary runner 45 and the primary gate 48 fills the primary cavity 41, the primary flow path forming member 11 is molded. When the fused resin which has passed through the second runner 46 and the second gate 49 fills the second cavity 42, the second flow path forming member 12 is molded (refer to FIG. 3B).

As described above, the primary cavity 41 and the second cavity 42 simultaneously mold the primary flow path forming member 11 and the second flow path forming member 12 by the primary injection molding process.

When a predetermined time for cooling the primary flow path forming member 11 and the second flow path forming member 12 has elapsed, the mold is opened by a mold opening/closing apparatus. More specifically, the mold plate 33 at the fixed side is separated from the runner plate 32, and the runner plate 32 is separated from the mold plate 34 at the movable side. When the mold plate 33 at the fixed side is separated from the runner plate 32, a primary sprue runner portion 61 formed by the primary injection molding is removed from the mold.

The primary flow path forming member 11 stays in the cavity of the mold plate 34 at the movable side and is separated from the runner plate 32. The second flow path forming member 12 stays in the cavity of the runner plate 32 and is separated from the mold plate 34 at the movable side (refer to FIGS. 4A and 4B)

The mold plate 34 at the movable side is transported upwardly in the axial direction of the guide axis 37 by a driving unit (not illustrated). The mold plate 34 at the movable side slides up to a position where the primary flow path forming member 11 faces the second flow path forming member 12 and then stops there (FIGS. 4B, 1A, and 2A).

When the mold plate 34 at the movable side completes to move, the mold is closed by the mold opening/closing apparatus. More specifically, the mold plate 33 at the fixed side contacts closely the runner plate 32, and the runner plate 32 contacts closely the mold plate 34 at the movable side. At this point, a core 34a of the mold plate 34 at the movable side is stored in a recessed portion 32a provided on the runner plate 32.

Further, the primary flow path forming member 11 and the second flow path forming member 12 that are molded by the primary injection molding process abut on each other. More specifically, the second flow path forming member 12 closes the opening portion of the groove formed on the primary flow path forming member 11 (refer to FIG. 5A).

Figure 5A:
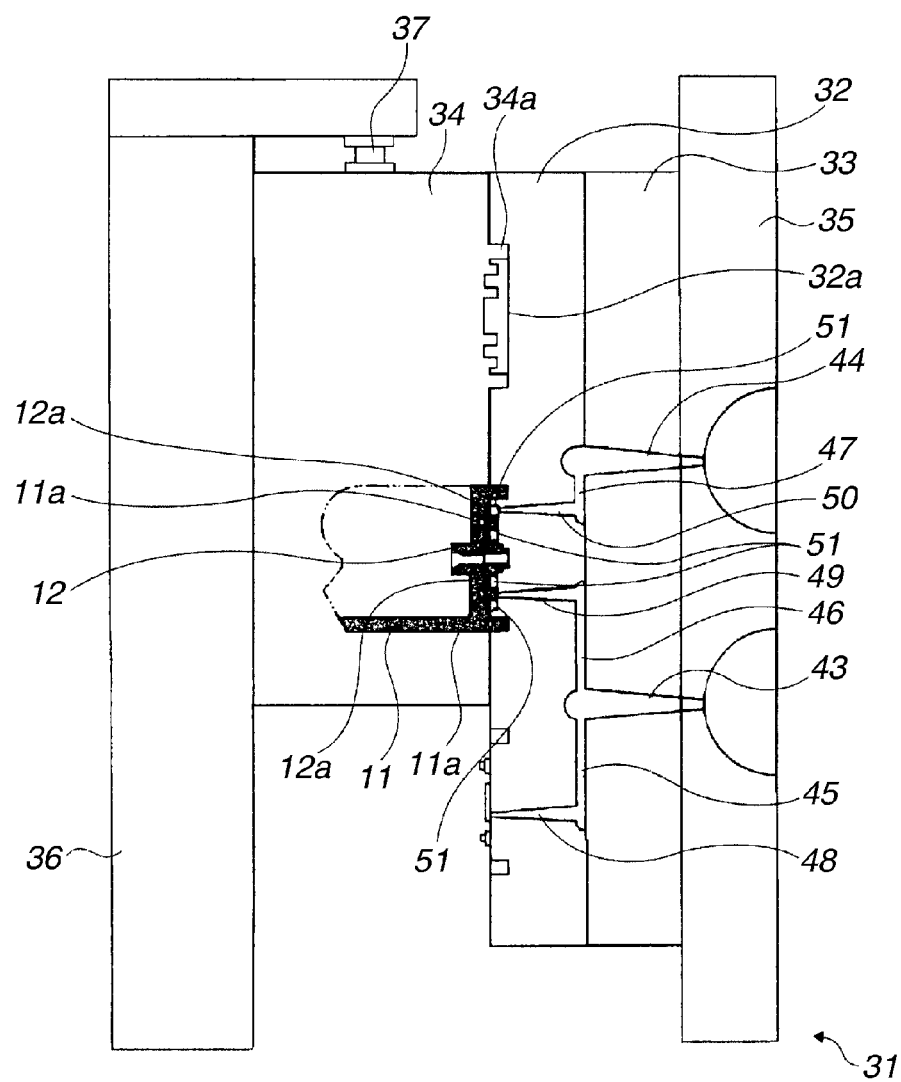
Figure 5B:
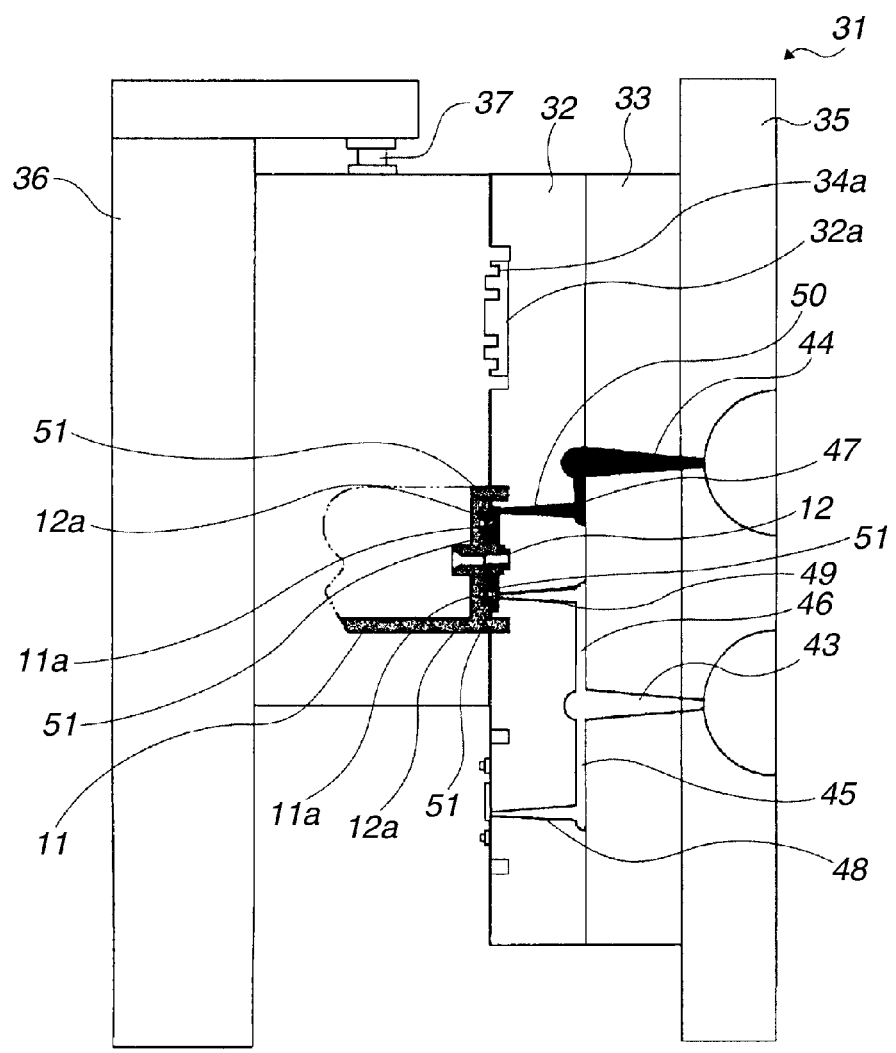

In FIG. 5A, a third cavity 51 is used for the second injection molding process described below. The third cavity 51 is a region surrounded by the runner plate 32, the primary flow path forming member 11 and the second flow path forming member 12. In a phase of the primary injection molding process, since the core 34a of the mold plate 34 at the movable side is inserted into this region, it is not filled with the fused resin.

The fused resin is injected from the injection device (not illustrated) to the second sprue 44. The fused resin which has passed through the second sprue 44, the third runner 47, and the third gate 50 fills the third cavity 51 to mold the bonding member 13 (refer to FIGS. 1C and 2C).

As described above, the bonding member 13 is molded and thus the primary flow path forming member 11 and the second flow path forming member 12 are bonded with each other to be integrated as the recording liquid supply unit 6. More specifically, the second flow path forming member 12 closes the opening portion of the groove of the primary flow path forming member 11 to form the recording liquid supply path 11a including the path in the tunnel shape.

Since the primary flow path forming member 11 and the second flow path forming member 12 stay in the cavity after the primary injection molding process, cooling of the resin remains unfinished, which means that the primary flow path forming member 11 and the second flow path forming member 12 keep a high temperature in the second injection molding process.

Since the resin fills the third cavity 51 with the temperature kept high as described above, the primary flow path forming member 11, the second flow path forming member 12, and the bonding member 13 are bonded with each other by welding. It is preferable that thermal plastic resin is used as the filling resin.

As described above, the heated three members which are provided independently are fused and bonded by receiving a pressure from the mold in the second injection molding. Further, since the primary flow path forming member 11, the second flow path forming member 12, and the bonding member 13 are molded by the same resin material, the three members are extremely securely bonded to be manufactured as an integrated product.

When a predetermined time for cooling the bonding member 13 has elapsed, the molding is opened by the mold opening/closing apparatus. The manufactured recording liquid supply unit 6 is removed from the mold plate 34 at the movable side. A second sprue runner portion 62 formed by the second injection molding is also removed from the mold (refer to FIG. 5C).

When the recording liquid supply unit 6 is removed, the mold plate 34 at the movable side is transported downwardly in the axial direction of the guide axis 37. The mold plate 34 at the movable side slides down to a position where the primary cavity 41 and the second cavity 42 can be molded, and then stops there.

The procedure described above is one example of the injection molding process.

As with the present exemplary embodiment, when quantity of a primary injection molding member is largely different from that of a second injection molding member, it is preferable to use the injection device having two cylinders, which can individually optimize molding conditions of the primary injection molding process and the second injection molding process.

Therefore, in the present exemplary embodiment, the injection device having two cylinders is used to injection-mold the same material in the primary injection molding and the second injection molding. Since the two separate members are bonded with each other by the material of the fused resin same as that of the two members, great adhesion strength can be obtained.

Further, according to the present invention, a pair of the moldings and the injection molding method are used to mold and bond the two members. Thus, relative positioning when the two members are bonded depends on an accuracy of positioning of the mold. As a result, components having a high accuracy can be manufactured.

With this structure, a problem of the bonding caused by poor positioning of the two members, which can be found in a conventional structure, can be avoided. Further, since the bonding process of the two members which is preformed in the conventional structure, can be abolished, productivity can be greatly improved.

A structure of the bonding section between the primary flow path forming member 11 and the second flow path forming member 12 will be described in detail.

Figure 6A:
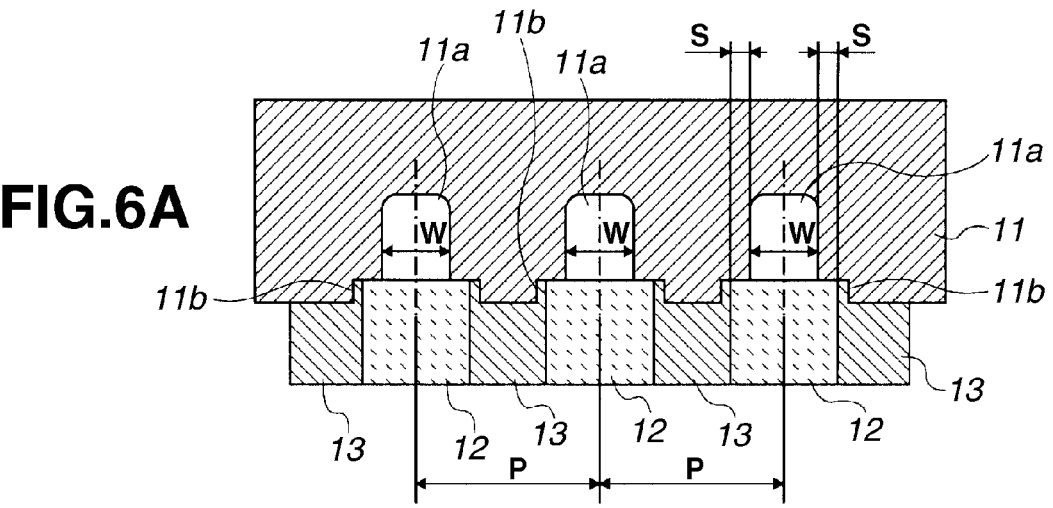
FIGS. 6A, 6B, and 6C are partial schematic cross-sectional views illustrating one example of a bonding section of two flow path forming members according to the present invention.

In FIG. 6A, a portion "S" indicates an overlap of the second flow path forming member 12 with the opening of the groove of the primary flow path forming member 11 for forming the recording liquid supply path 11a. More specifically, a width of an arm portion 12a of the second flow path forming member 12 is acquired by adding a double dimension of the "S" to a width of the opening of the groove for forming the recording liquid supply path 11a. The overlap "S" is used to prevent the resin from getting into the recording liquid supply path 11a when the resin which becomes the bonding member 13 fills the second injection molding process.

Since the primary flow path forming member 11 abuts on the second flow path forming member 12 with a mold clamping force, even if the overlap "S" is small, the bonding member 13 can be prevented from coming in.

This overlap "S" may have a width 0.1 mm to 0.6 mm to sufficiently implement the function. For example, when a center in a width direction of the groove of the primary flow path forming member 11 for forming the recording liquid supply path 11a corresponds with a center in a width direction of the arm portion 12a of the second flow path forming member 12, the width of the arm portion 12a may be 0.2 mm to 1.2 mm larger than the width of the groove of the primary flow path forming member 11.

Further, since the two members are bonded with each other by filling with the bonding member by the injection-molding method in a state where the primary and second flow path forming members abut on each other in the molds, a width of the bonding member 13 can be set small.

As described above, since the overlap "S" and the width of the bonding member 13 can be set small, a distance "P" between the recording liquid supply paths 11a (refer to FIGS. 6A, 8A, and 8B) can be also set small. Therefore, the liquid jet recording head can be drastically decreased in size.

An upper limit of the overlap "S" is not 0.6 mm, and the value "S" can be freely set if decreasing the size of liquid jet recording head is not required. A structure in which the arm portion 12a of the second flow path forming member abuts on a gap 11b provided at an edge of the opening of the groove of the primary flow path forming member 11 (refer to FIG. 6A), can improve an effect in preventing the bonding member 13 from getting into the recording liquid supply path.

More specifically, since a large flow resistance can be generated in a space between the gap 11b and the arm portion 12a, an effect same as that obtained by increasing the size of the overlap "S" can be generated without increasing the size of the liquid jet recording head.

Figure 6B:
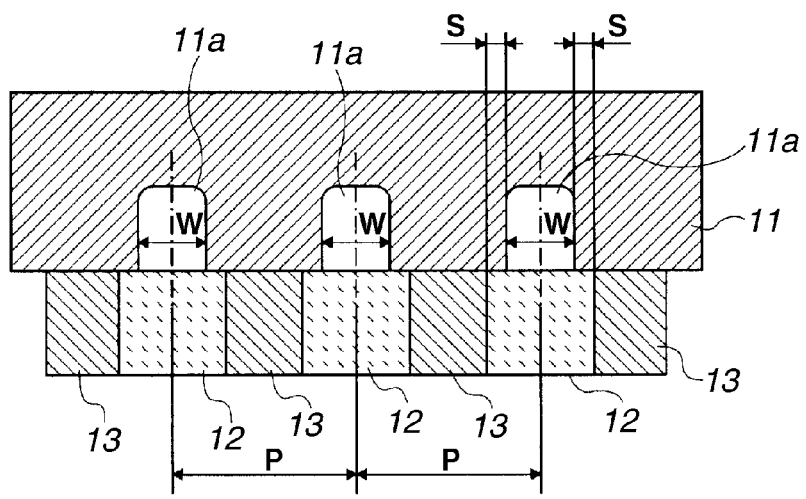

Further, according to the present exemplary embodiment, as illustrated in FIG. 6B, the gap 11b as illustrated in FIG. 6A may not be provided at the primary flow path forming member 11.

Figure 6C:
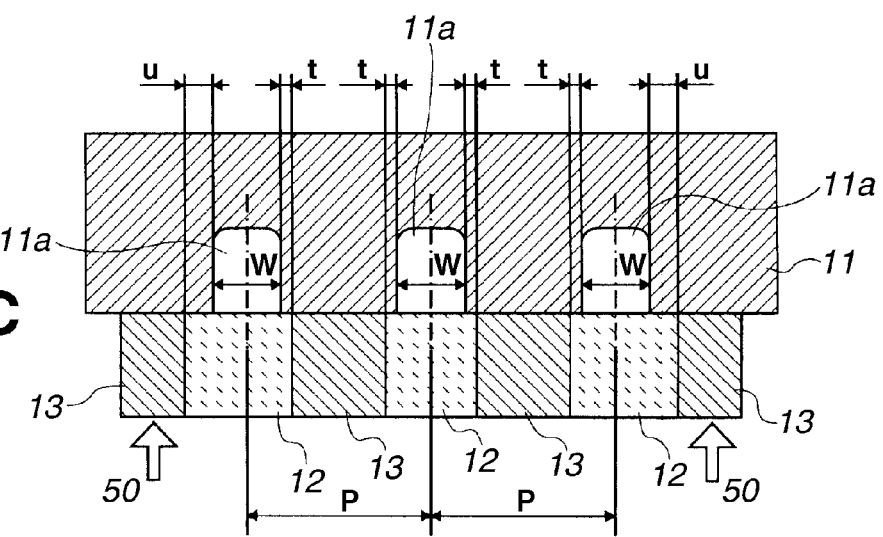

Furthermore, in the width direction of the groove of the flow path, the width of the right overlap of the second flow path forming member 12 with the opening of the groove forming the recording liquid supply path 11a may be different from that of the left overlap (reference symbols "t" and "u" in FIG. 6C).

For example, in the second injection molding process, a filling pressure becomes large near a gate 51 for filling with the resin to be used as the bonding member 13. To address the problem, the overlap is set larger as illustrated by the reference symbol "u" near the third cavity 51, while the overlap is set smaller as illustrated by the reference symbol "t" not near the third cavity 51.

A first exemplary embodiment of a liquid jet recording head according to the present invention will be described.

Figure 7A:
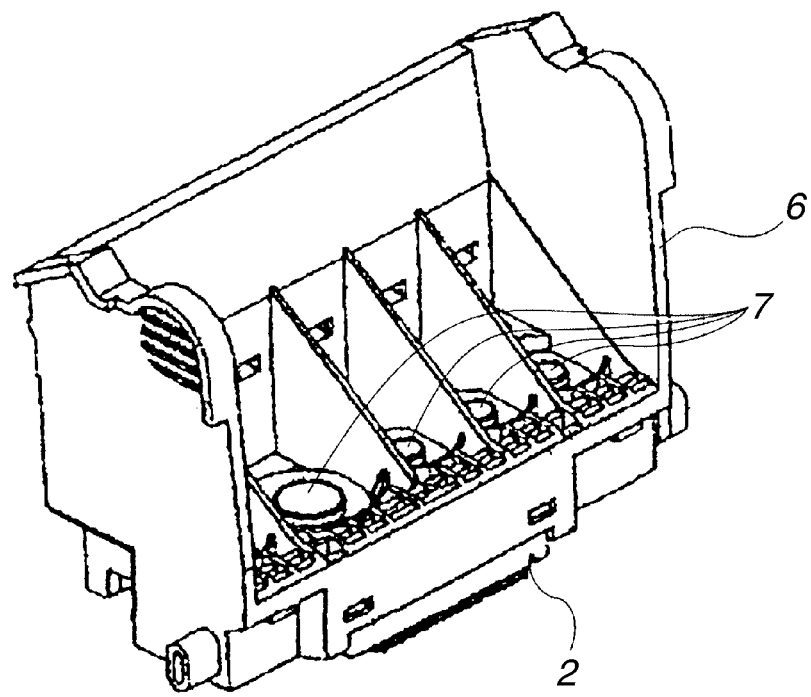
FIGS. 7A, 7B, and 7C are perspective views illustrating an exemplary embodiment of the recording liquid supply unit in the liquid jet recording head according to the present invention.
Figure 7B:
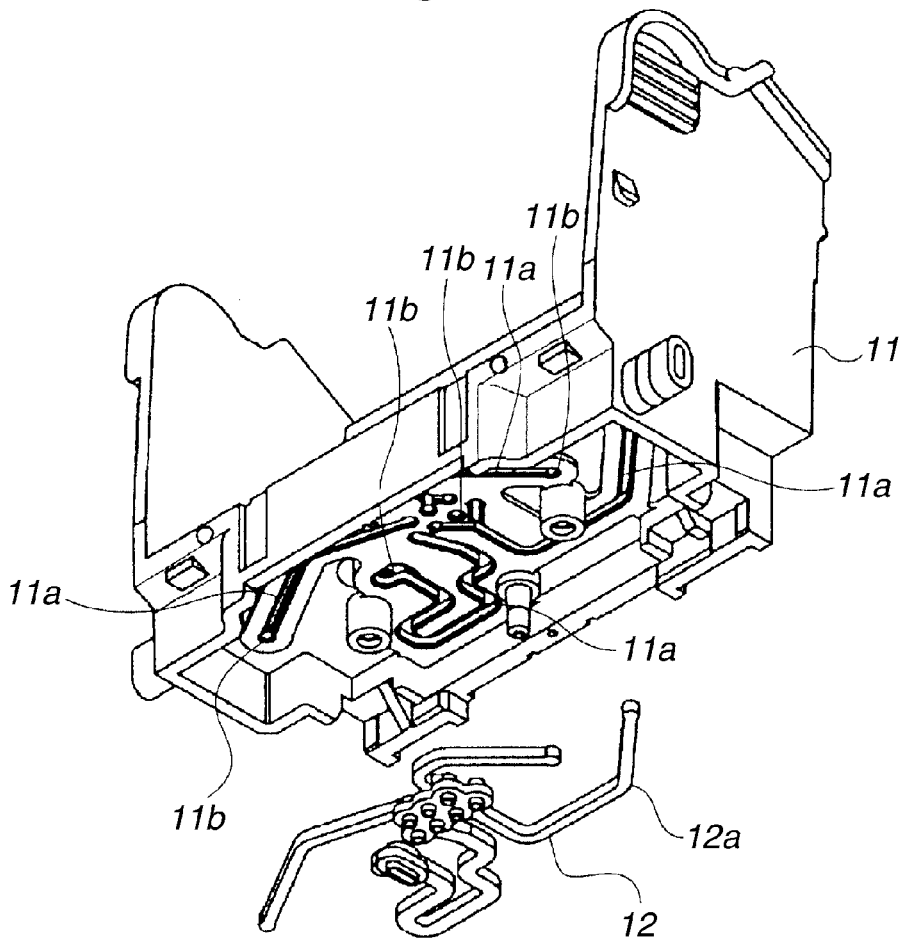
Figure 7C:
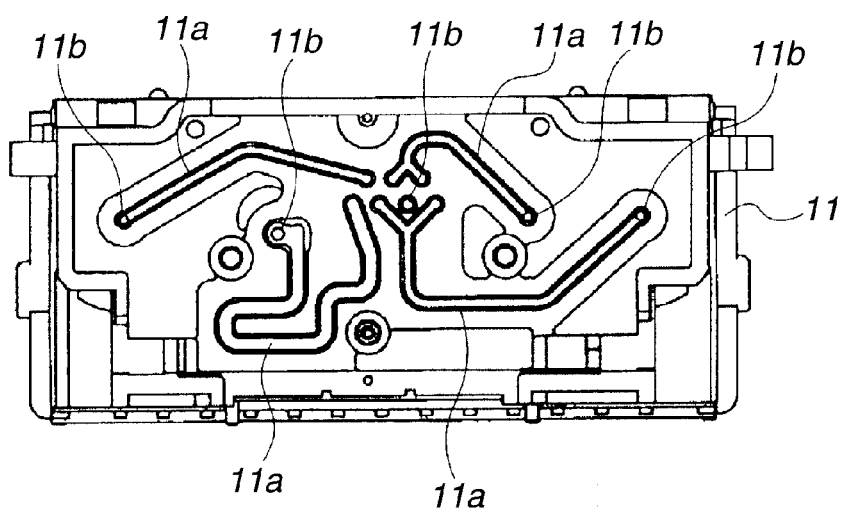

FIG. 7A is a perspective view illustrating the exemplary embodiment of the liquid jet recording head according to the present invention. FIG. 7B is a perspective view illustrating a state in which the recording liquid supply unit in the liquid jet recording head according to the present exemplary embodiment is divided into two members. FIG. 7C is a bottom plan view illustrating the primary flow path forming member in a state illustrated in FIG. 7B.

Figure 8A:
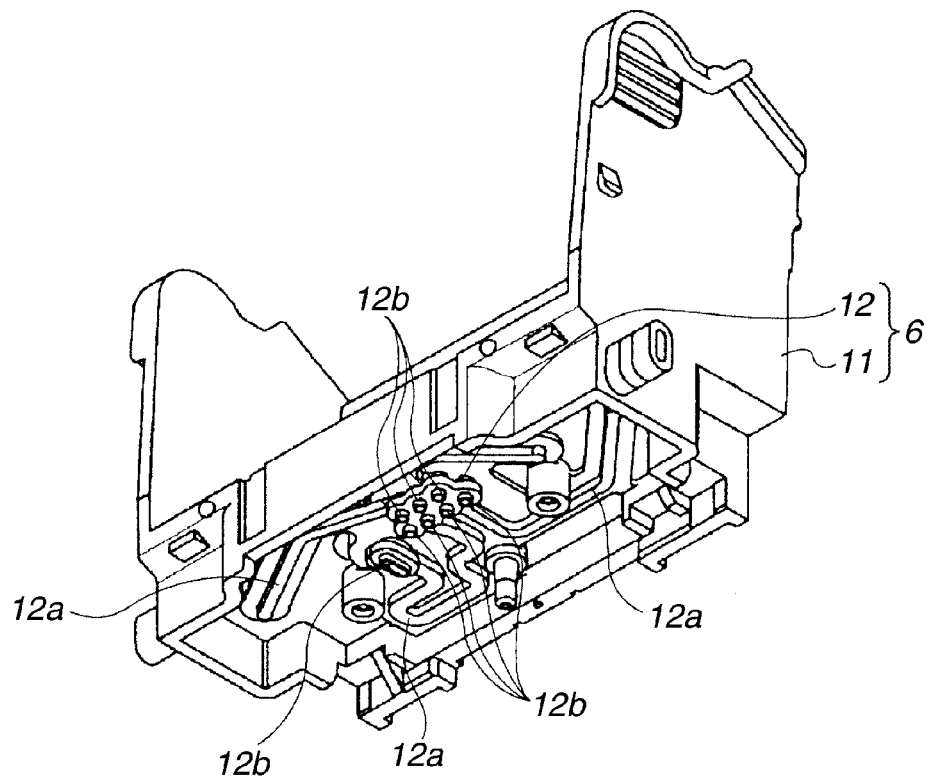
FIGS. 8A, 8B, 8C, and 8D illustrate an exemplary embodiment of the recording liquid supply unit in the liquid jet recording head according to the present invention.
Figure 8B:
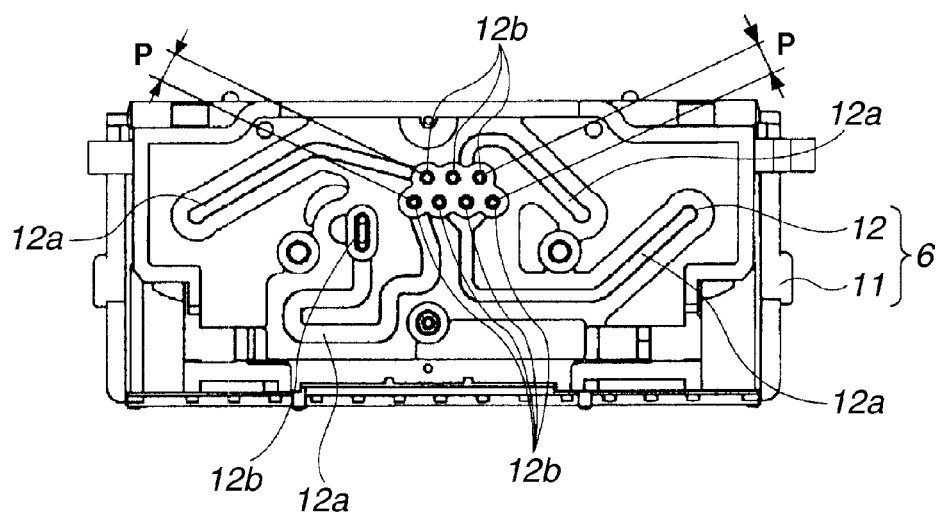
Figure 8C:
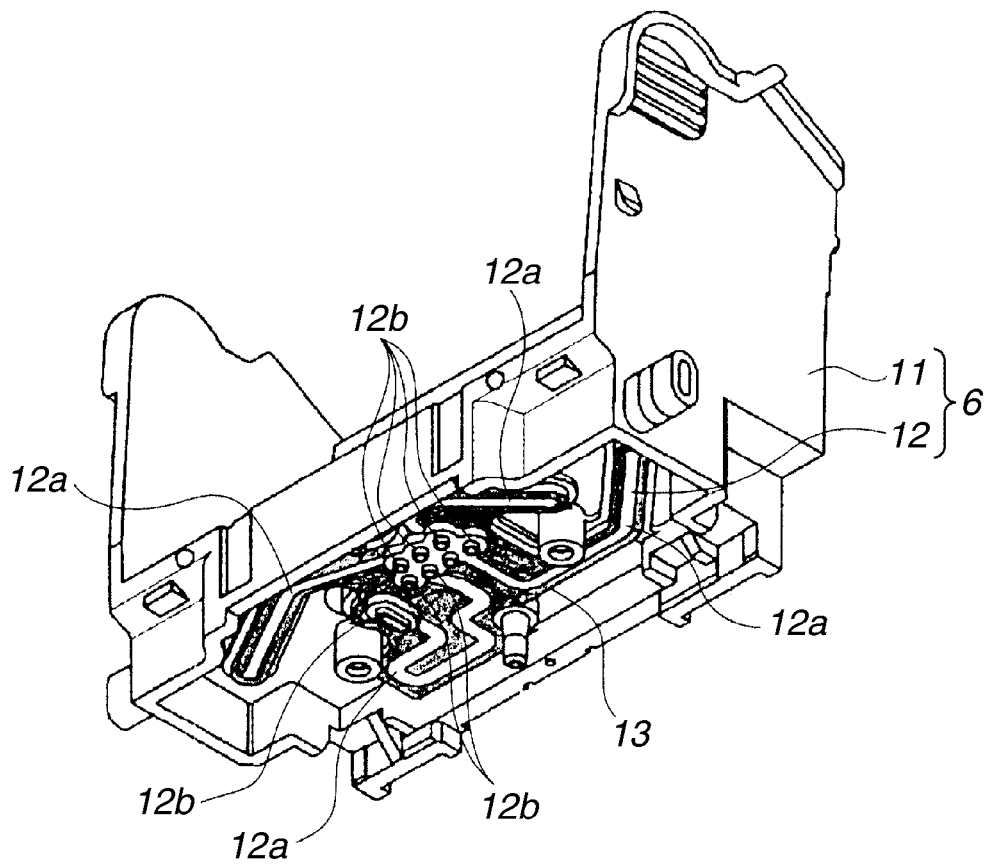
Figure 8D:
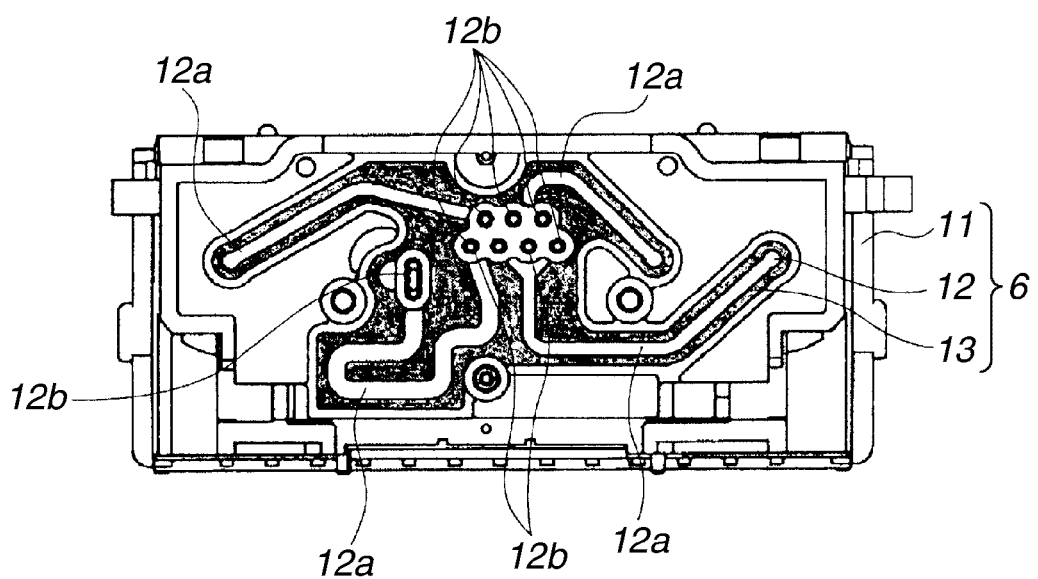

FIG. 8A is a perspective view illustrating a state in which the two flow path forming member constituting the recording liquid supply unit in the liquid jet recording head according to the present exemplary embodiment abut on each other. FIG. 8B is a bottom plan view illustrating the two flow path forming members illustrated in FIG. 8A. FIG. 8C is a perspective view illustrating a state in which the two flow path forming members constituting the recording liquid supply unit in the liquid jet recording head according to the present exemplary embodiment are bonded with each other. FIG. 8D is a bottom plan view of the two flow path forming members illustrated in FIG. 8C.

The liquid jet recording head according to the present invention includes a recording liquid discharge unit 2 and the recording liquid supply unit 6 as illustrated in FIG. 7A. The recording liquid discharge unit 2 includes a droplet discharge unit and an electric wiring unit (not illustrated). The droplet discharge unit discharges the droplets from the nozzle array including arrayed discharge ports for discharging the droplets according to a print signal.

The electric wiring unit receives/transmits the print signal transmitted between the liquid jet recording head and the main body of the liquid jet recording apparatus, and includes a sheet wiring member such as a flexible cable and a tape automated bonding (TAB) for providing electric wiring in the droplet discharging unit. The recording liquid supply unit 6 holds the recording liquid discharge unit 2 and is used as a casing for mounting and holding a recording liquid storage tank (not illustrated).

The droplet discharge port of the recording liquid discharge unit 2 includes a recording element substrate, a supporting substrate for supporting the recording element substrate, and an electric wiring substrate.

The recording element substrate is provided with a plurality of recording elements (not illustrated) for discharging the recording liquid onto one of the surfaces of a Silicon (Si) substrate. Further, wiring of aluminum (Al) for supplying electricity to each recording element is formed by a film formation technique.

A plurality of flow paths and a plurality of discharge ports (not illustrated) corresponding to the recording elements are formed by a photo lithography technique. A recording liquid chamber (not illustrated) for supplying the recording liquid to a plurality of flow paths, which are connected to the discharge ports, are formed to be open on a rear surface of the recording element substrate.

The recording liquid supply unit 6 includes the two members of the primary flow path forming member 11 and the second flow path forming member 12. According to the present exemplary embodiment, the primary flow path forming member 11 is also used as a casing for holding the recording liquid storage tank.

The primary flow path forming member 11 is provided with the groove, which becomes the recording liquid supply path 11a, on a bottom surface thereof. The second flow path forming member 12 is provided with a plurality of portions having a small width and a large length 12a (hereafter, referred to as an arm portion). The arm portion 12a is formed to fit the outline of the groove, which becomes the recording liquid supply path 11a on the bottom surface thereof.

The arm portion 12a of the second flow path forming member 12 is used as the cap for closing the opening of the groove which becomes the recording liquid supply path 11a and is formed on the bottom surface of the primary flow path forming member 11 (refer to FIGS. 1A, 1B, 7B, 7C, 8A, and 8B).

Such a primary flow path forming member 11 and second flow path forming member 12 are formed by the injection molding described above and bonded with each other by the bonding member 13. The bonding member 13 is formed to cover a periphery of a portion at which the edge of the opening of the groove which becomes the recording liquid supply path 11a in the primary flow path forming member 11, abuts on the arm portion 12a of the second flow path forming member 12 (refer to FIGS. 1D, 8C, and 8D).

According to the present exemplary embodiment, when the liquid jet recording head is mounted on the liquid jet recording apparatus (e.g., an ink jet printer of a serial type), the primary flow path forming member 11 is disposed upward with respect to the gravity, while the second flow path forming member 12 is disposed downward. Accordingly, the second flow path forming member 12 having a cap-like shape is formed to cover the opening of the groove of the recording liquid supply path 11a of the primary flow path forming member 11 from a lower side relative to the gravity.

The recording liquid flowing into a supply port 7 of the recording liquid supply unit 6 from the recording liquid storage tank (recording liquid storage container) flows through the recording liquid supply path 11a formed of the primary flow path forming member 11 and the second flow path forming member 12.

The recording liquid which has reached the downstream side of the recording liquid supply path 11a is supplied to the recording element substrate which is the droplet discharge port included in the recording liquid discharge unit 2, from the outlet port 12b formed on the second flow path forming member 12. A plurality of recording liquid supply paths 11a are formed depending on a type of the recording liquid contained in the recording liquid storage tank.

Figure 9:
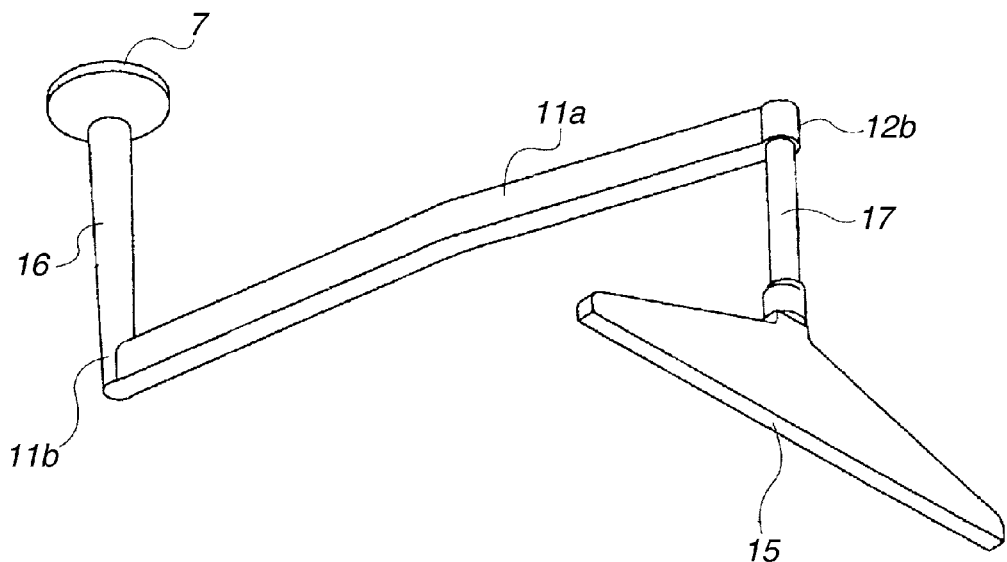
FIG. 9 schematically illustrates a flow path portion from a supply port to be connected with a recording liquid storage tank, to a common liquid chamber in a recording element substrate according to the exemplary embodiment of the present invention.

FIG. 9 schematically illustrates a part of the flow path from the supply port 7, which is to be connected to the recording liquid storage tank to the common liquid chamber in the recording element substrate.

In the primary flow path forming member 11 of the recording liquid supply unit 6, a primary vertical flow path 16 extended in a substantially-vertical direction with respect to the recording element substrate is formed from the supply port 7. At an end of the primary vertical flow path 16, a flow path communication port 11b which is to be connected to an upstream end of the recording liquid supply path 11a is provided.

A second vertical flow path 17 extended in the substantially-vertical direction with respect to the recording element substrate is connected to a outlet port 12b at a downstream end of the recording liquid supply path 11a. The second vertical flow path 17 is formed in the supporting substrate of the recording element substrate and connected to the common liquid chamber in the recording element substrate.

Cross sections of the primary vertical flow path 16 and the second vertical flow path 17 are formed in a shape of a circle or a rectangular which makes the flow resistance smallest. Since the primary vertical flow path 16 and the second vertical flow path 17 are extended in a vertical direction from the recording element substrate, the generated bubble comes up to an upstream side of the flow path, and then gets stuck at an end portion of the vertical flow path.

The bubble coming up afterward is integrated with the bubble which has gotten stuck at the upstream side of the vertical flow path. Since the cross section of the vertical flow path is formed in a shape of a circle or a rectangular, the recording liquid or the bubble can be smoothly flown toward a downstream side. More specifically, since the bubble stuck at the upstream side of the vertical flow path can be readily flown to the downstream side, the bubble can be readily discharged even by simple suction process.

By the structure as described above, the recording liquid supplied from the recording liquid storage tank through the supply port 7 flows to the recording element substrate through paths as described below. Namely, the recording liquid flows from recording liquid storage tank Supply port 7→Primary vertical flow path 16→Flow path communication port 11b→Recording liquid supply path 11a→Outlet port 12b→Second vertical flow path 17→Common liquid chamber 15→Recording element substrate According to the present exemplary embodiment described above, the arm portion 12a of the second flow path forming member 12 in the cap-like shape for closing the opening of the groove of the primary flow path forming member 11 is formed in the necessary smallest shape along with the outline of the recording liquid supply path 11a. Further, the void portion for containing the adhesive for bonding the two members does not need to be secured.

Since the two flow path forming members are bonded by the injection molding, a region of the bonding section can be set small. Since the cross section of the flow path of the recording liquid supply path 11a has the substantially-rectangular shape, the large cross-section area can be secured.

The effects as described above can be obtained, thus, the distance between the adjacent flow paths can be set small, thereby realizing the compact liquid jet recording head.

A second exemplary embodiment according to the present invention will be described.

As with the arm portion 12a of the second flow path forming member 12, which becomes the cap of the recording liquid supply path 11a described above, a portion which has a small width and thickness and a large length easily gets into the mold cavity. Such a portion can be deformed when the molds are separated (when the mold is opened).

Generally, getting into the cavity at the movable-mold side (mold plate 34 at the movable side) when the molds are separated from each other is referred to as "caught". If the "caught" happens when the molds are separated from each other, the dimension accuracy of the molded product is drastically deteriorated. Further, a desired shape can be destroyed.

Such deformation caused by the "caught" into the cavity at the movable-mold side extremely frequently happens near the flow path communication port 11b situated away from the adjacent region of the plurality of outlet ports 12b.

Countermeasures against the above-described problems will be described with reference to FIGS. 10A, 10B, 10C, 10D, 11A, 11B, and 11C, in which the similar structural elements to those in the first exemplary embodiment have the same reference numerals. Thus, the descriptions of the first exemplary embodiment should be referred to regarding the similar structural elements.

Figure 10A:
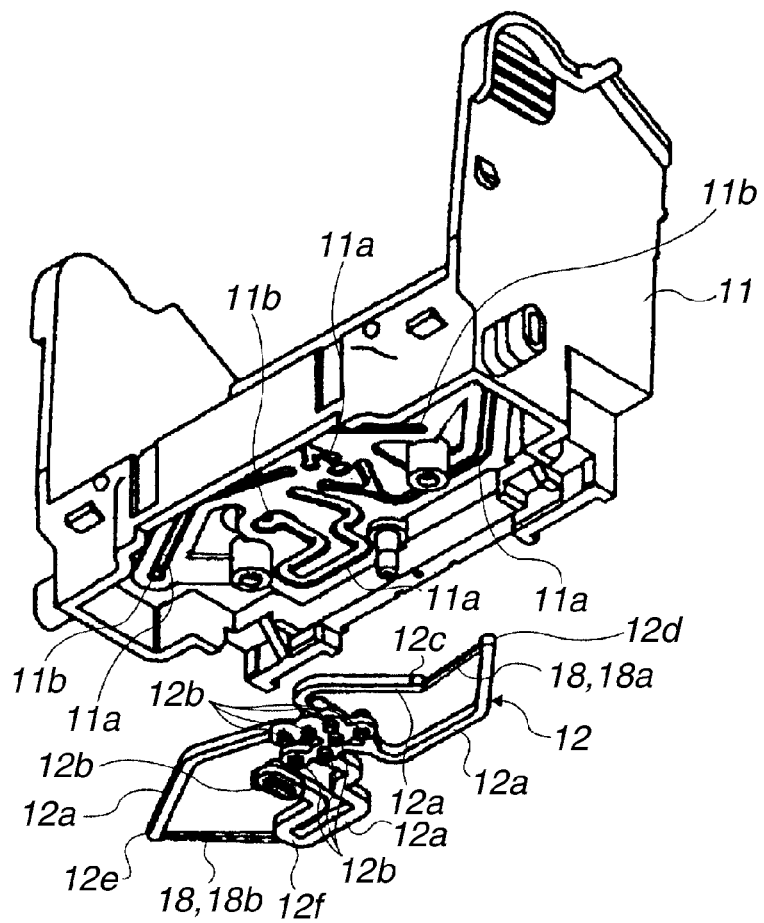
FIGS. 10A, 10B, 10C, and 10D illustrate an exemplary embodiment of the recording liquid supply unit in the liquid jet recording head according to a second exemplary embodiment of the present invention.
Figure 10B:
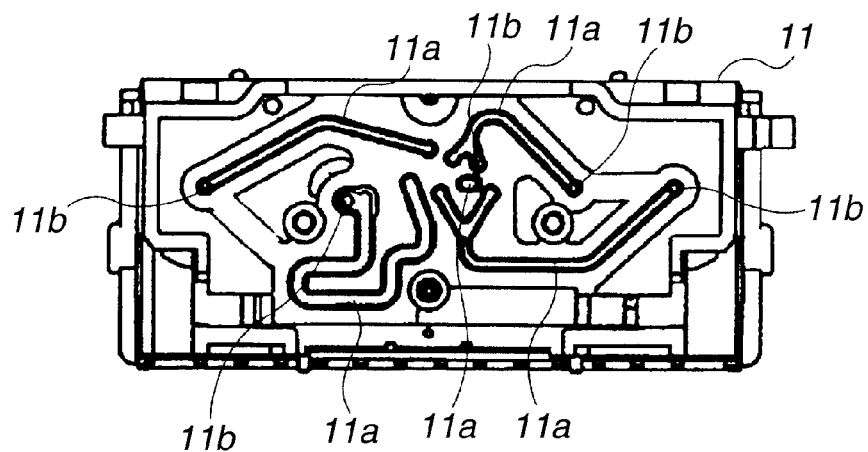
Figure 10C:
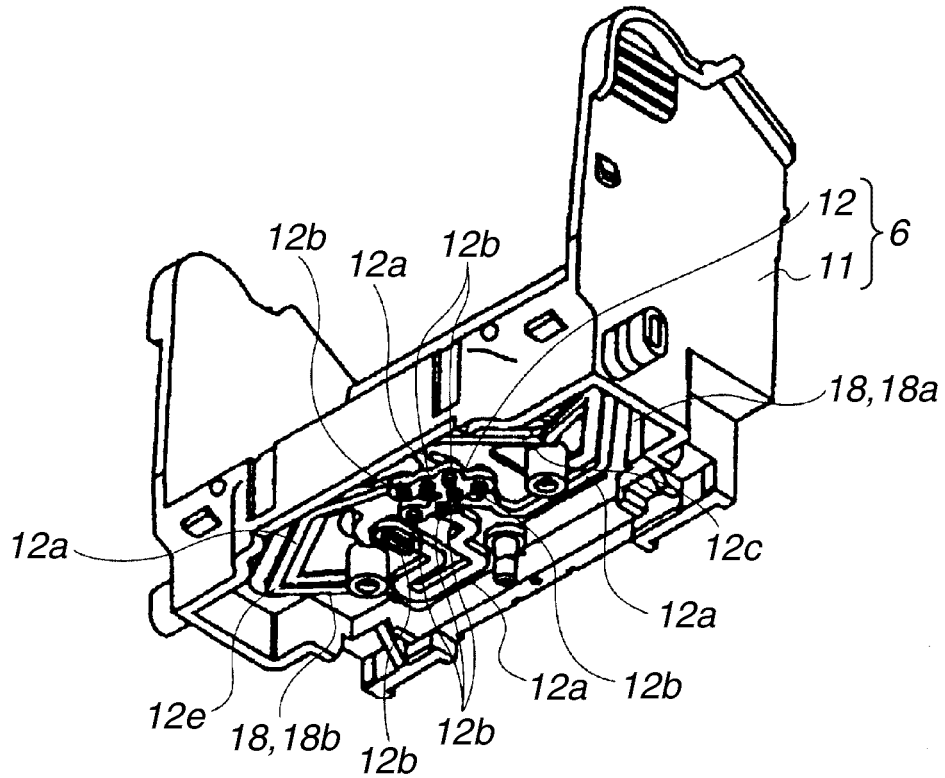
Figure 10D:
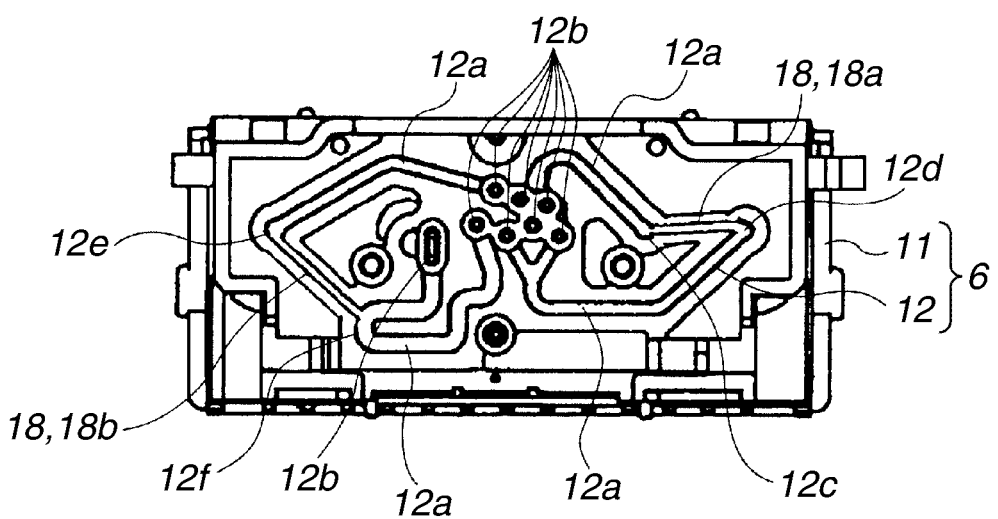

FIG. 10A is a perspective view illustrating a state in which the recording liquid supply unit is divided into the two members. FIG. 10B is a bottom plan view illustrating the primary flow path forming members in a state illustrated in FIG. 10A. FIG. 10C is a perspective view illustrating a state in which the two flow path forming members constituting the recording liquid supply unit of the present exemplary embodiment abut on each other. FIG. 10D is a bottom plan view illustrating the two flow path forming members in a state illustrated in FIG. 10C.

Figure 11A:
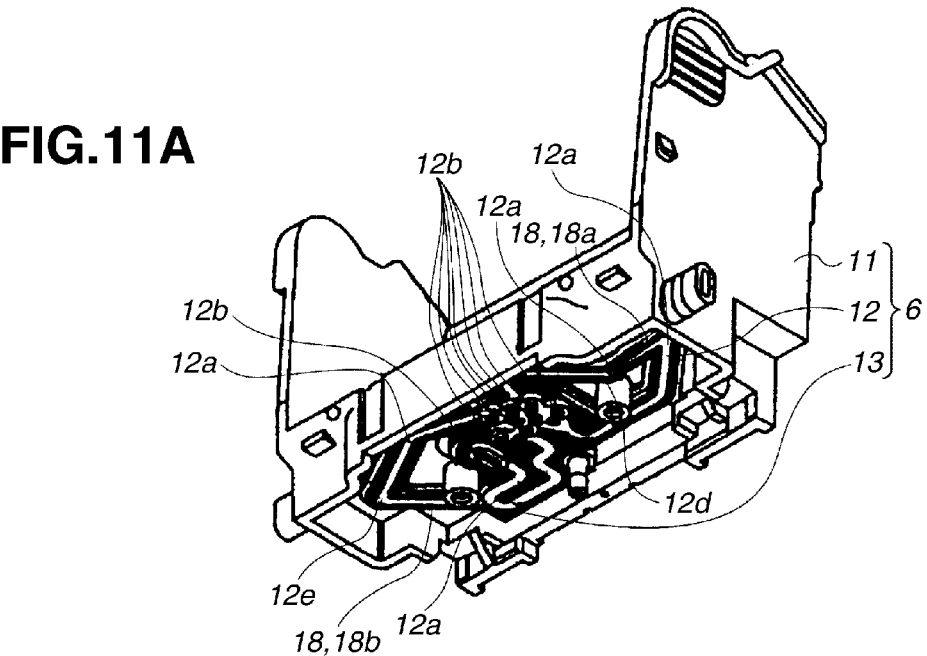
FIGS. 11A, 11B, and 11C illustrate the exemplary embodiment of the recording liquid supply unit in the liquid jet recording head according to the exemplary embodiment of the present invention.
Figure 11B:
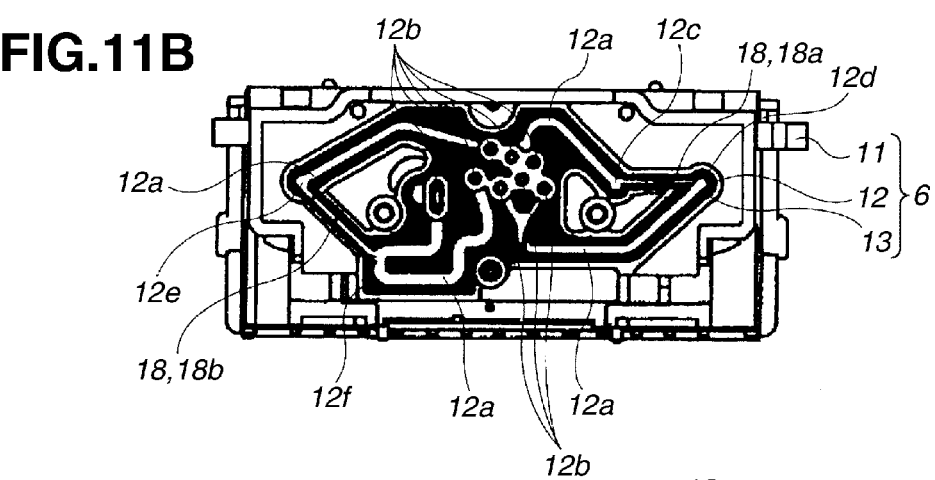

FIG. 11A is a perspective view illustrating a state in which the two flow path forming members constituting the recording liquid supply unit of the present exemplary embodiment are bonded with each other. FIG. 11B is a bottom plan view illustrating the two flow path forming members in a state illustrated in FIG. 11A.

The second flow path forming member 12 integrally includes a plurality of arm portions 12a and bridges portions 18 (18a and 18b), each of which connects both end portions of each arm portion 12a at a side of the flow path communication port 11b.

According to the present exemplary embodiment, an end 12c of a certain arm portion 12a at a side of the flow path communication port 11b is connected with an end 12d of another arm portion 12a at the side of the flow path communication port 11b by the bridge portion 18a. Further, an end 12e of another arm portion 12a at the side of the flow path communication port 11b is connected with an end 12f of another arm portion 12a at the side of the flow path communication port 11b by the bridge portion 18b.

The bonding member 13 is formed to cover a periphery of a portion where a bottom surface of the primary flow path forming member 11 abuts on the bridge portions 18 (18a and 18b) as well as a periphery of a portion where the bottom of the primary flow path forming member 11 abuts on the arm portion 12a of the second flow path forming member 12.

According to the first exemplary embodiment, one end of each arm portion 12a of the second flow path forming member 12 at the side of the flow path communication port 11b is isolated without no connection with anything, unlike the end of the other side (refer to FIGS. 8A and 8B).

According to the present exemplary embodiment, each of ends 12c, 12d, 12e or a middle portion 12f of each arm portion 12a of the second flow path forming member 12 at the side of the flow path communication port 11b are connected with a corresponding end by the joint member 18. This structure can prevent the molded second flow path forming member 12 from being "caught" into the cavity at the movable-mold side.

As a further countermeasure, if a gate for injecting the resin into the mold cavity which molds the joint member 18 is provided, the joint member 18 can increasingly get into the mold cavity at a fixed-mold side.

Generally, since a large molding pressure is applied to a periphery of the gate to inject the resin into the cavity, filling density of the resin becomes high therein. The resin is increasingly taken into the cavity in the region where the filling density of the resin is high, and thus the "caught" into the cavity at the movable-mold side can be decreased.

Accordingly, if the gate is provided at a portion of the mold cavity for the joint member 18, one end 12c, 12d, 12e or the middle portion 12f of the each arm portion 12a at the side of the flow path communication port 11b can be securely prevented from being "caught". As a result, the recording liquid supply unit 6 can be built up as a molded component having an excellent dimension accuracy.

Figure 11C:
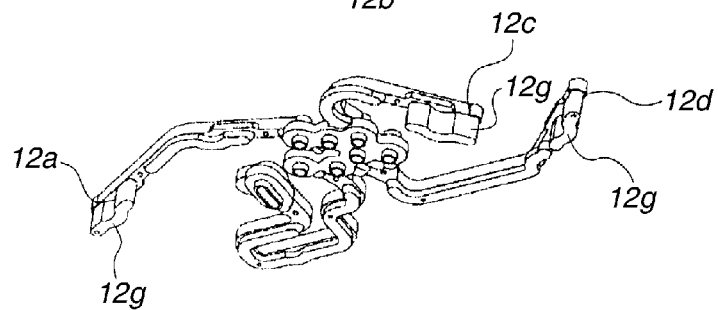

Further, as another countermeasure, as indicated by a reference numeral 12g illustrated in FIG. 11C, thickness of end portions 12c, 12d, and 12e of the arm portions 12a of the second flow path forming member 12 at the side of the flow path communication port 11b may be increased at the fixed-mold side compared to other portions. Or, the end portions 12c, 12d, and 12e may have a pin-like shape at the fixed-mold side.

With the countermeasure described above, since the resistance generated when the end portions of the arm portion 12a at the side of the flow path communication port 11b are separated from the cavity at the fixed-mold side (the plate 33 at the fixed side), the end portions 12c, 12d, and 12e of the arm portions 12a can be prevented from being "caught" into the cavity at the movable-mold side.

According to the present exemplary embodiment, since the arm portion 12a of the second flow path forming member 12 which abuts on the edge of the opening of the groove of the primary flow path forming member 11 can be prevented from deforming, the bonding sections of the primary flow path forming member 11 and the second flow path forming member 12 can be closely bonded with each other without generating a void. As a result, when the resin used as the bonding member 13 fills a periphery of the bonding section, the resin can be prevented from getting into the recording liquid supply path 11a.

A third exemplary embodiment will be described with reference to FIGS. 12A, 12B, 12C, and 12D.

As described above, according to the present invention, the primary flow path forming member 11 and the second flow path forming member 12 are molded within the same mold. The edge of the opening portion of the groove formed in the primary flow path forming member 11 and the arm portion 12a of the second flow path forming member 12 abut on each other within the mold. The bonding member 13 fills the periphery of the abutting portion in order to bond the two members.

At this point, it is crucial that the resin used as the bonding member 13 does not get into the recording liquid supply path 11a formed of the groove of the primary flow path forming member 11 and the arm portion 12a of the second flow path forming member 12. To address the problem, FIG. 6A illustrates a setting of the overlap "S", and the second exemplary embodiment describes the improved shape of the second flow path forming member 12. The present exemplary embodiment will further describe another countermeasure. The present exemplary embodiment will further describe another solution.

As described in the first exemplary embodiment, when the groove which becomes the recording liquid supply path 11a is formed in one of walls of the primary flow path forming member 11, if the wall beneath the groove has the same thickness as that of other portions and the thickness over the wall is uniform, the member can be excellently molded. A portion in which the groove is formed is raised compared to other portions, as the thickness of the wall is constant. As a result, a certain range from the edge of the groove has a thick wall. When the shape of the groove becomes more complicated, the wall becomes thick over the wider range of the periphery of the groove and also between the grooves (refer to FIG. 7C).

The thick wall tends to cause the sink mark when the second flow path forming member 12 is hardened. When a complicated shape of the recording liquid supply path 11a is formed as described in the first exemplary embodiment, and when the sink mark is generated in a periphery where the second flow path forming member 12 abuts on the primary flow path forming member 11, the bonding section of the primary flow path forming member 11 and the second flow path forming member 12 generates a void therein. Thus, there is a possibility that the resin used as the bonding member 13 gets into the recording liquid supply path 11a.

Figure 12A:
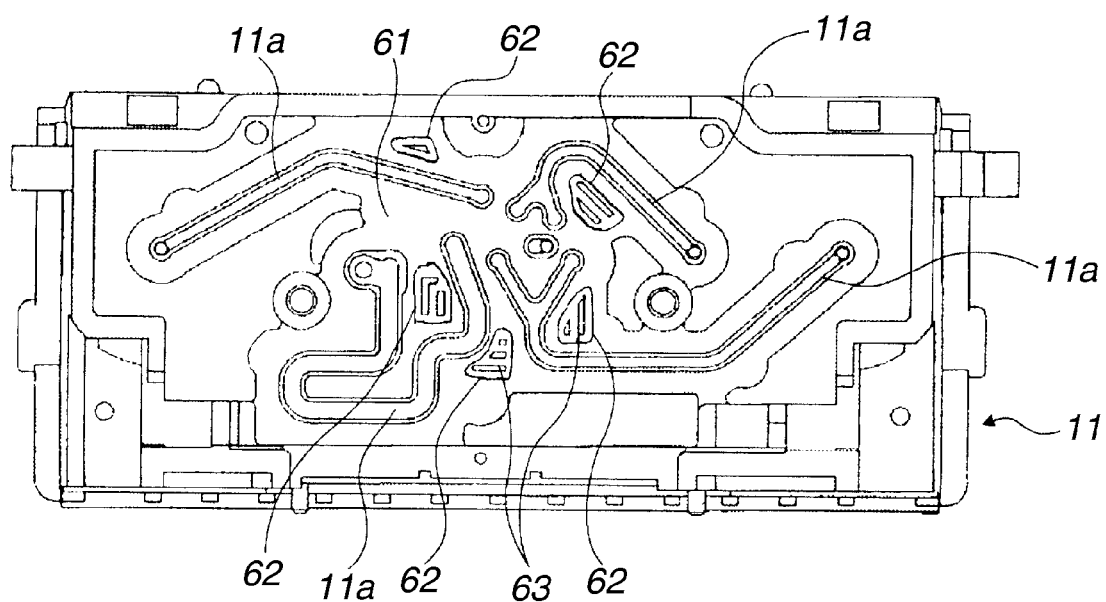
FIGS. 12A, 12B, 12C, and 12D illustrate the liquid jet recording head according to a third exemplary embodiment of the present invention.

According to the present exemplary embodiment, as illustrated in FIG. 12A, a thin portion 62 of the primary flow path forming member is formed in a thick portion 61 which is the periphery of the groove which becomes the recording liquid supply path 11a. A place of the thin portion is determined by specifying a place where the sink mark is generated at a time of producing the recording liquid supply unit 6 as a prototype. With this arrangement, the recording liquid supply path without projections and depressions can be formed.

Figure 12B:
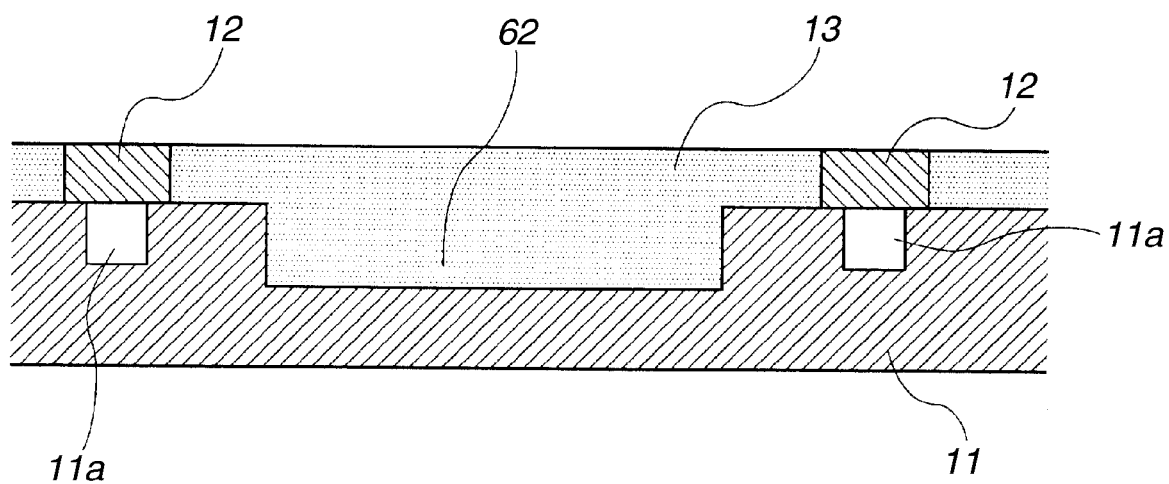

FIG. 12B is a cross-sectional view illustrating the bonding member 13 when the periphery of the groove which becomes the recording liquid supply path 11a is formed thinner. As illustrated in FIG. 12B, the bonding member 13 is formed thicker around the thin portion 62 of the primary flow path forming member than other portions.

Figure 12C:
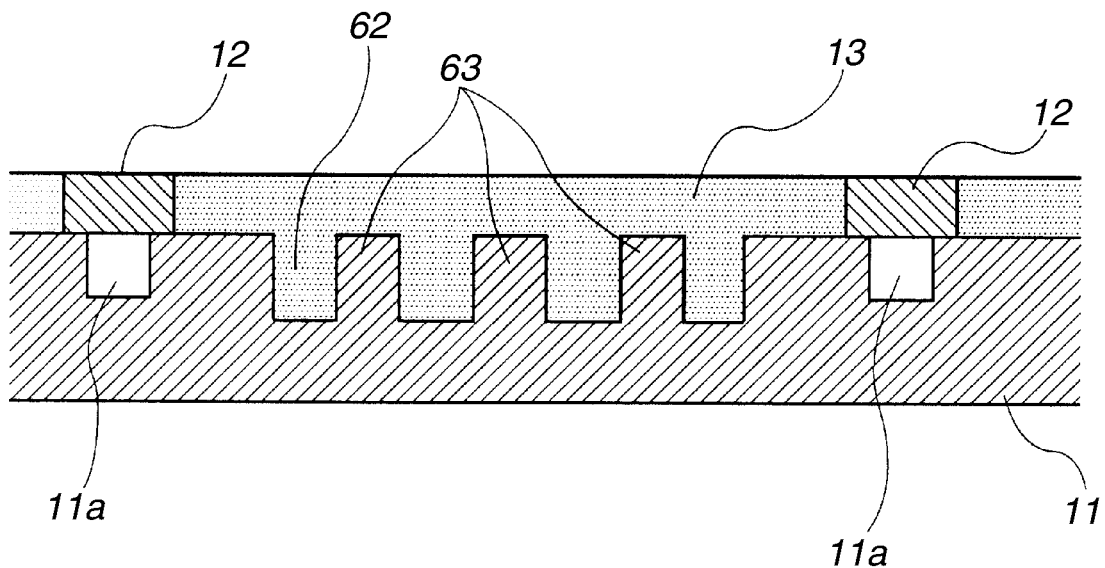

Accordingly, the bonding member 13 at the thin portion 62 of the primary flow path forming member formed as described above, which is a recessed portion, tends to cause the sink mark when the member is hardened. The sink mark can pull the second flow path forming member 12 to generate a space in the bonding section of the primary flow path forming member 11 and the second flow path forming member 12. According to the present exemplary embodiment, as illustrated in FIG. 12C, one or a plurality of ribs 63 are provided in the recessed portion which becomes the thin portion 62 of the primary flow path forming member. The ribs 63 can prevent generating of the sink mark in the bonding member 13 to form the recording liquid supply path without the projections and depressions on a surface thereof.

Figure 12D:
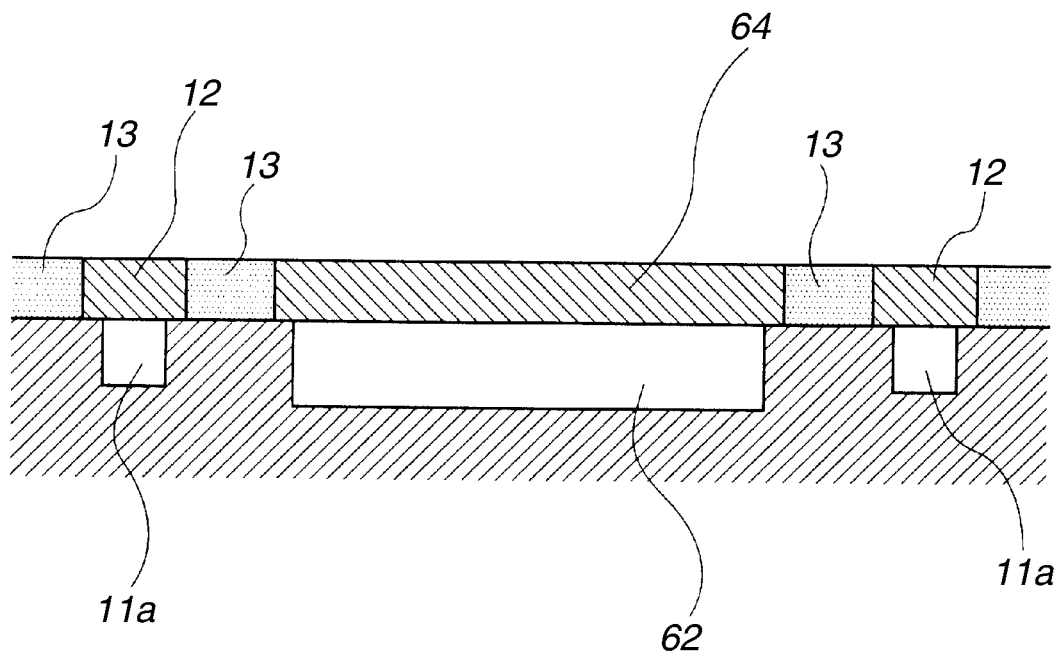

Further, FIG. 12D illustrates another example for preventing the sink mark in the bonding member 13. In this example, an opening of the recessed portion is closed with the cap member 64 so that the bonding member 13 is not filled in the recessed portion which becomes the thin portion 62 of the primary flow path forming member. Since the bonding member 13 is not formed thick in this structure, the sink mark is not generated when the member is hardened. The product can be molded without deteriorating a shape of the recording supply path. Further, since the thin portion 62 of the primary flow path forming member is formed to be an air hole, the material to be used can be decreased by an amount of the air hole, thereby decreasing costs of the liquid jet recording head.

A fourth exemplary embodiment according to the present invention will be described with reference to FIGS. 13A and 13B, in which the similar structural elements to those in the first and second exemplary embodiments have the same reference numerals. Thus, the descriptions of the first and second exemplary embodiments should be referred to regarding the similar structural elements.

When the primary flow path forming member 11 is bonded with the second flow path forming member 12 by the conventional method such as the conventional adhesive, the ultrasonic wave vibration welding, and the laser welding, there is a limitation to decreasing the size of the head.

More specifically, the bonding method using the adhesive needs a space for collecting the adhesive to prevent the adhesive from getting into the recording liquid supply path. The ultrasonic wave vibration welding method needs a fusion-bonded portion, for example in a rib-like shape, and a space for collecting the fused resin to prevent the fused resin from getting into the recording liquid supply path.

Such a void collection portion is appropriately secured in a direction orthogonal to a flow direction of the recording liquid. The larger this void collection portion is, the larger the contact strength becomes. The laser welding method needs spaces at both sides of a portion to be irradiated with the laser so that the laser beam does not get onto a surface of the flow path.

Figure 19A:
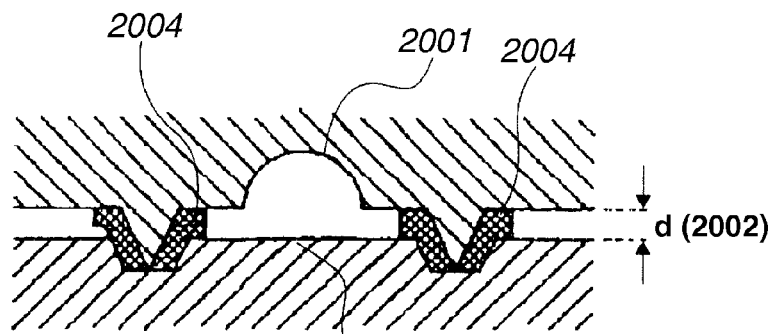
FIGS. 19A, 19B, 19C, and 19D illustrate the structure of the conventional flow paths.
Figure 19B:
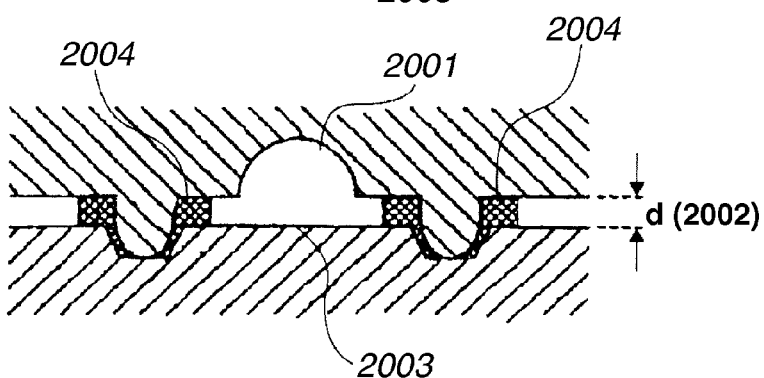
Figure 19C:
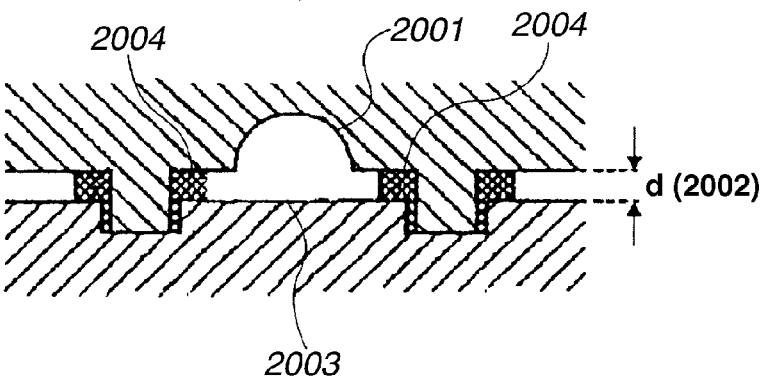
Figure 19D:
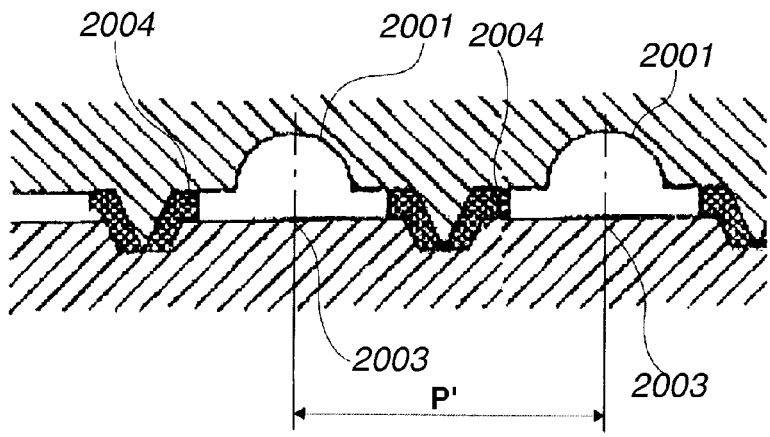

As described above, the space regions at both sides of the bonding section need to be secured in the method such as the adhesive, the ultrasonic wave, and the laser welding. However, providing the space region causes a problem when decreasing a distance "P'" between adjacent recording liquid supply paths at a time of designing (refer to FIG. 19D). Thus, the space region is an obstacle in decreasing the size of the liquid jet recording head.

Figure 20:
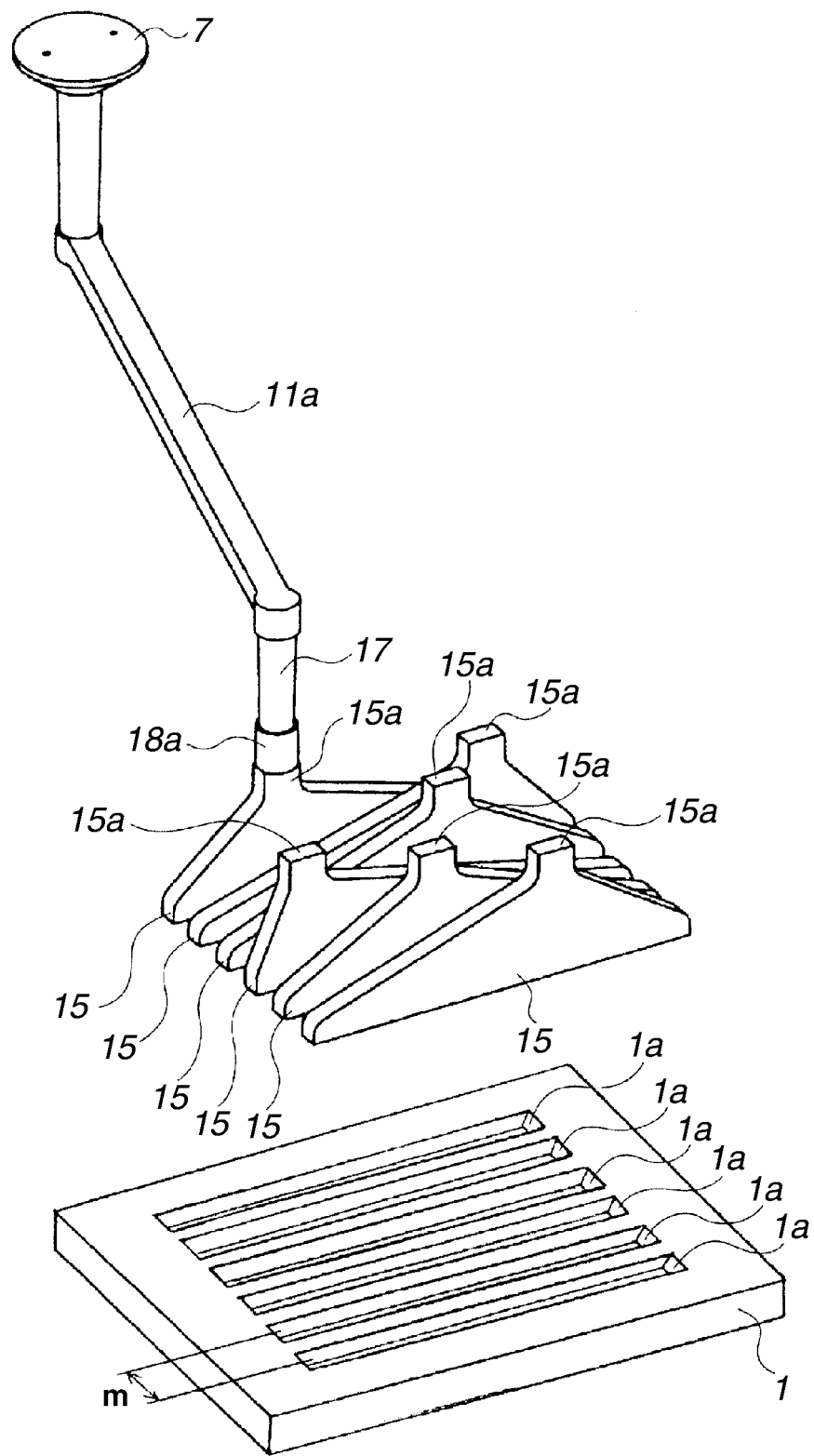
FIG. 20 illustrates the structure of the conventional flow paths.

As illustrated in FIG. 20, in recent years, an improved high-polymer wiring technology can set a distance "m" between the adjacent second common liquid chambers 1a to be smaller, thereby decreasing a size and the costs of an outer shape of the recording element substrate 1. However, as described above, the conventional bonding method has difficulties to decrease the distance "P'" between the recording liquid supply paths along with the decreased distance "m" between the adjacent second common liquid chambers. Thus, the second vertical flow paths 17 provided at an end of the recording liquid supply path are irregularly arrayed so that the recording liquid supply path of each color has the different arrangement.

FIG. 20 is a schematic view illustrating an example of the conventional flow path from an ink supply port to which the recording liquid storage tank is connected, to the primary common liquid chamber 15 through the recording liquid supply path 11a.

The recording liquid supply port 15a of the primary common liquid chamber 15 in a substantially-triangle shape is disposed in a communicating manner to extend the second vertical flow path 17. It is preferable that the recording liquid supply port 15a is disposed in a center in a lengthwise direction of the primary common liquid chamber 15. However, the recording liquid supply port 15a must be disposed away from the center in the lengthwise direction of the primary common liquid chamber 15 due to a limitation regarding the distance "P'" between the adjacent recording liquid supply paths as described above.

Accordingly, as illustrated in FIG. 20, the recording liquid supply ports 15a are irregularly formed to have a different arrangement for each primary common liquid chamber 15 with respect to the lengthwise direction of the primary common liquid chamber 15. Further, in the conventional head structure in which a same kind of the recording liquid is divided into a plurality of primary common liquid chambers 15, it is necessary to arrange the recording liquid paths so that they do not cross with each other.

Such an arrangement of the heads further increases irregularity in an array of the recording liquid supply ports 15a. As a result, as illustrated in FIG. 20, each primary common liquid chamber 15 is formed in a different-triangle shape.

The substantially-triangle shape of the primary common liquid chamber 15 determined by the arrangement of the recording liquid supply port 15a is a crucial factor for determining flowing and filling performances of the recording liquid. The structure in which the primary common liquid chambers 15 in the substantially-triangle shape are irregularly arrayed in parallel, deteriorates a flowing or filling balance of the recording liquid.

More specifically, the suction recovery control becomes more difficult and thus the more complicated suction recovery control is required. Further, a joint member for seal-connecting the second vertical flow path 17 to the primary common liquid chamber 15 has a more complicated shape, thereby increasing the size and the costs of the liquid jet recording head.

The present invention can solve the problem described above.

More specifically, since the bonding method of the present invention can set smaller the overlap "S" illustrated in FIGS. 6A and 6B and a width of the bonding member 13 between the adjacent recording liquid supply paths, the distance "P" between the adjacent recording liquid supply paths 11a can be decreased.

According to the present invention, for example, a width of the flow path "W" of the recording liquid supply path 11a can be 1 mm, and the distance "P" between the adjacent recording liquid supply paths can be 1.8 mm. In the flow path forming member bonding method described in the first and second cases of the conventional examples, when the width "W" of the flow path of the recording supply path is 1 mm, the distance "P" between the adjacent recording liquid supply paths is around 2.8 mm.

Figure 13A:
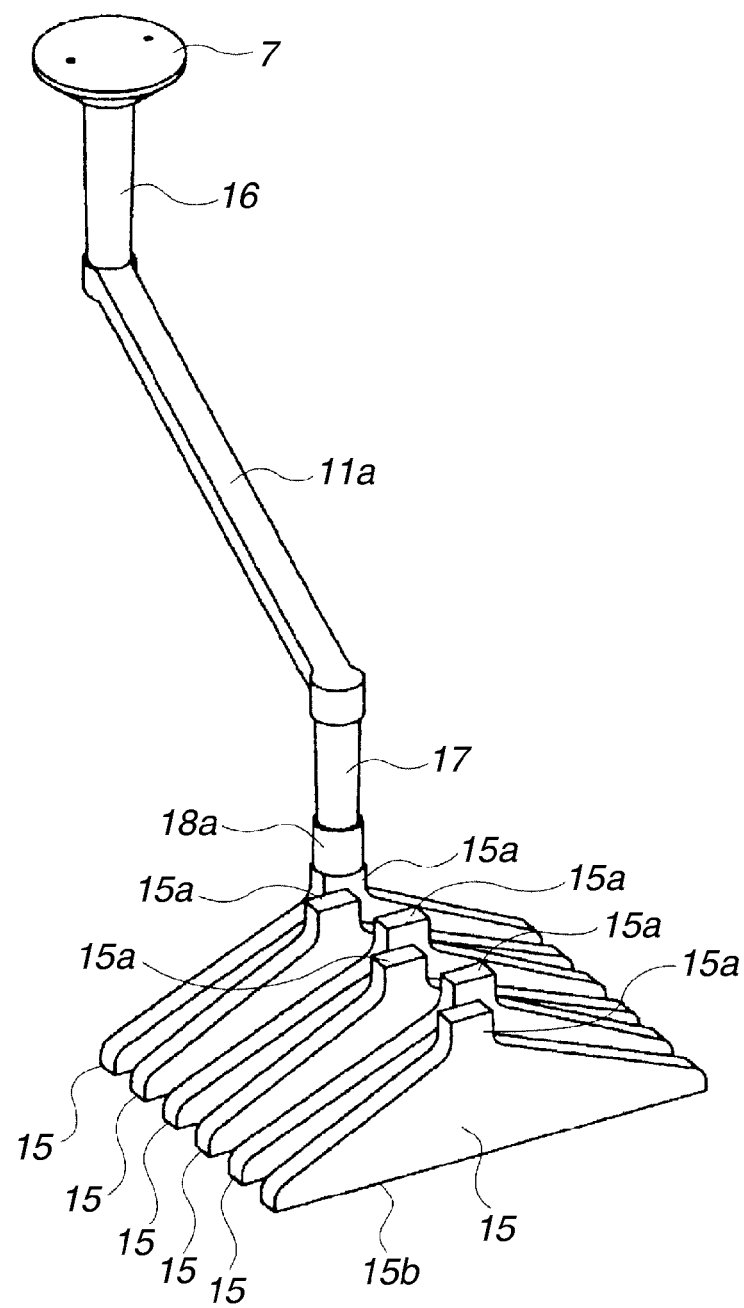
FIGS. 13A and 13B are perspective views illustrating a path from the supply port of the tank to the common liquid chamber in the recording element substrate and a joint member according to a fourth exemplary embodiment of the present invention.
Figure 13B:
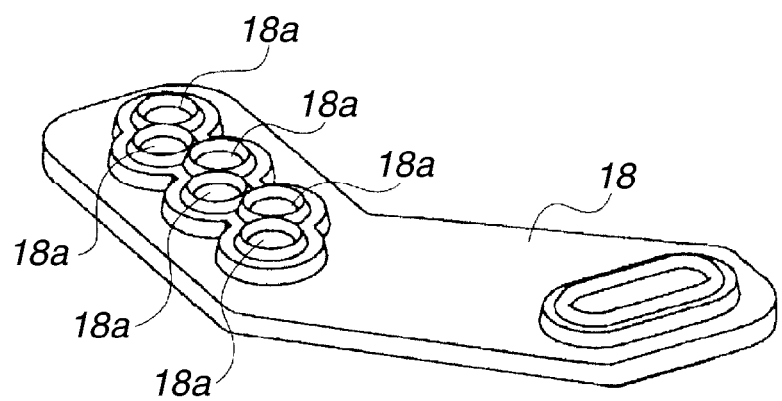

As described above, since the distance "P" between the adjacent recording liquid supply paths can be decreased, the recording liquid supply ports 15a can be arranged regularly as illustrated in FIG. 13A. In FIG. 13A, a first, third, and fifth primary common liquid chambers 15 from a near side have a same direction and a same shape. The second, fourth, and sixth primary common liquid chambers 15 have a same direction and a same shape.

Further, when the primary common liquid chambers 15 arranged in the odd numbers are reversed about a center line of the bottom surface 15b of the primary common liquid chamber 15 as a main axis, the shapes of the primary common liquid chambers 15 arranged in the odd numbers correspond to those of the primary common liquid chambers 15 arranged in the even numbers. More specifically, all of the primary common liquid chambers 15 have the same substantially-triangle shape and thus the arrangement thereof is well balanced for a suction recovery performance. Therefore, the liquid jet recording head shows excellent performances in flowing and filling of the recording liquid, thereby simplifying the suction recovery control.

Owing to the decreased distance "P" between the adjacent recording liquid supply paths, the supply ports 15a can be regularly disposed. Accordingly, a size of the joint member 18 can be reduced. The joint member 18 constitutes a communication port 18a having a high sealing capability between the supply port 15a of the primary common liquid chamber 15 at a side of the recording element substrate and a recording liquid outlet port at a side of the recording liquid supply unit 6 (refer to FIG. 13B). The joint member 18 having the decreased size can decrease the costs of the components.

As described above, according to the present exemplary embodiment, the recording liquid supply path can be appropriately arranged within a small region. Thus, the distance "m" between the adjacent second common liquid chambers on the recording element substrate illustrated in FIG. 20 can be decreased, thereby decreasing the size of the outer shape and the costs of the liquid jet recording head.

A manufacturing method according to the present invention applied to other products will be described as a fifth exemplary embodiment.

Japanese Patent Application Laid-Open No. 8-183061 discusses a method for manufacturing hollowed molded products. According to the method, in a primary molding, a gap portion is provided on an inner peripheral side of an opening edge of the container in a concave shape, which has a flange portion protruding from a surface of an outer peripheral side of the opening edge In the primary molding, a flat plate to be fixed into the gap portion of the opening edge of the container is molded. The flat plate is provided with a flange portion protruding from the surface opposite to the container side. In a second molding, in a state where an outer peripheral edge of the flat plate is fixed into the gap portion of the container, the fused resin fills a space between a flange portion of the container and the flange portion of the flat plate to integrally form the container and the flat plate. Thus, the closed hollowed product can be manufactured.

By such a method, since the flange portion is necessary as a bonding section, a width of the molded product can be increased in a direction parallel to the flat plate. Further, since the flange portion protrudes from the container, the method is not appropriate when decreasing the size of the product. Furthermore, for a product including a plurality of hollow portions formed of the concave portion of the container and the flat plate, the plurality of hollow portions are not suitably arranged in high density since the hallow portion needs the flange portion.

According to the manufacturing method of the present invention as described above, the two of the primary flow path forming member 11 and the second flow path forming member 12 are molded in the same mold, and the opening edge of the groove formed on the primary flow path forming member 11 and the arm portion 12a of the second flow path forming member 12 abut on each other in the mold. With the state described above, the bonding member 13 fills the periphery of the abutting section to bond the two members. Thus, the recording liquid supply path 11a having the hollow portion therein is obtained (refer to FIGS. 1A, 1B, 6A, 6B, and 6C).

By the manufacturing method according to the present invention, the hollowed molded product has no portion protruding outside from the hollow portion obtained by bonding the first half-manufactured product and a second half-manufactured product, thereby decreasing the size of the hollowed molded product.

The present exemplary embodiment will be described below with reference to Figs.

Figure 14A:
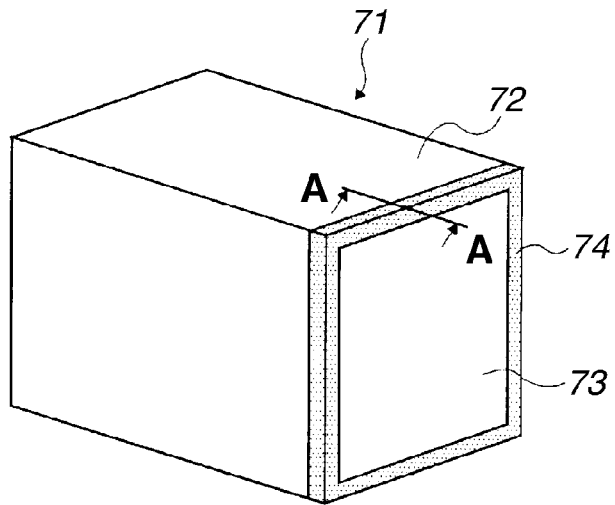
FIGS. 14A, 14B, and 14C illustrate a fifth exemplary embodiment as an example of a manufacturing method applicable to the present invention.
Figure 14B:
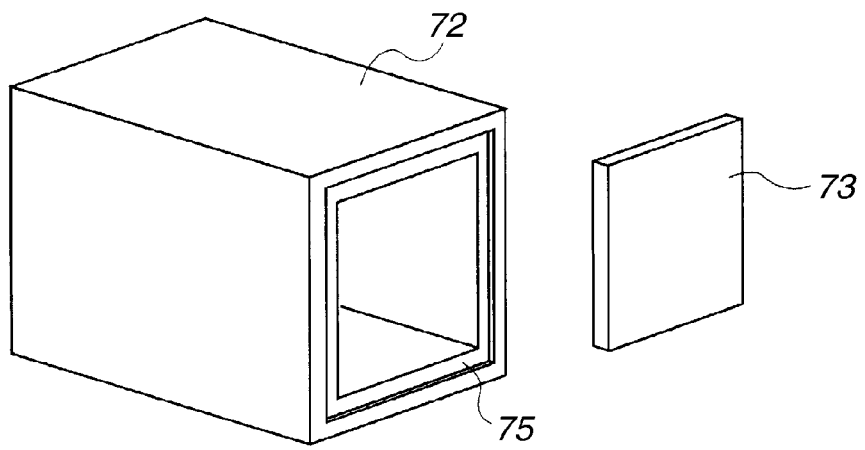

FIG. 14A illustrates a hollowed product 71 according to the present exemplary embodiment which includes a primary molded product 72 and a second molded product 73. As illustrated in FIG. 14B, the primary molded product 72 is molded to form a container in a concave shape with a bottom wall and a surrounding wall. The second molded product 73 has a flat plate shape and is molded in a substantially cap-like shape. Neither of the primary molded product 72 nor second molded product 73 have a portion protruding outside to make a bonding.

Figure 15A:
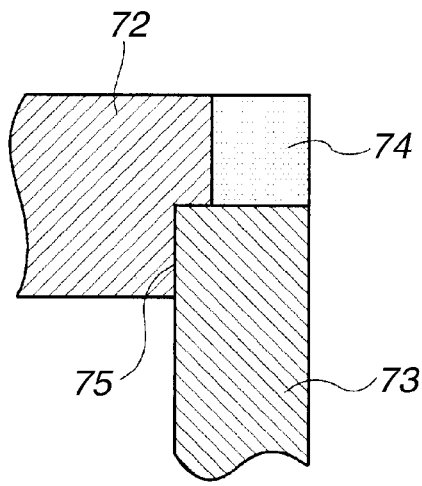
FIGS. 15A, 15B, and 15C illustrate the fifth exemplary embodiment as an example of the manufacturing method applicable to the present invention.

FIG. 15A is a cross sectional view taken along line A-A in FIG. 14A. The second molded product 73 is placed in the gap portion 75 at the inner peripheral side of the opening edge of the primary molded product 72. The bonding member 74 used as a sealing material fills the periphery formed of the primary and second molded products to integrate the two products into the hollowed molded product.

Figure 14C:
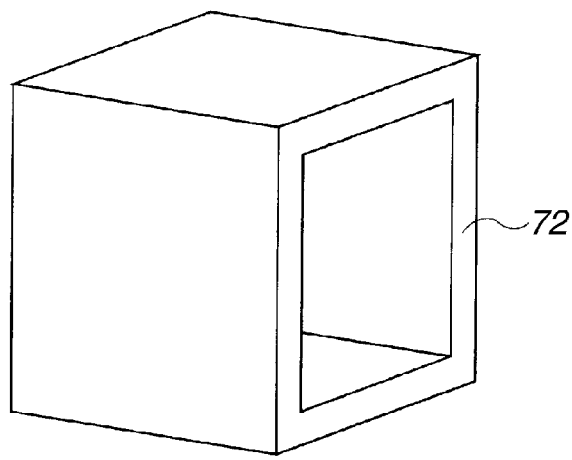
Figure 15B:
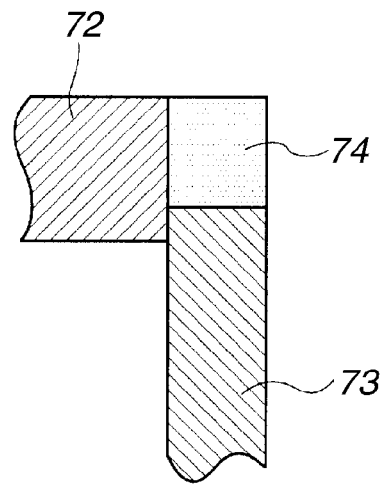

The gap portion 75 provided in the primary molded product 72 is used for positioning the second molded product 73, and is not necessarily needed if other unit for positioning such as the mold is available. The primary molded product 72 may be formed as illustrated in FIGS. 14C, more specifically, in FIG. 15B.

According to the exemplary embodiment, since a range necessary for bonding the primary molded product 72 and the second molded product 73 are only the periphery of the primary and second molded products, the hollowed product can be decreased in size. Further, the shape of the hallowed product can be freely designed.

Figure 15C:
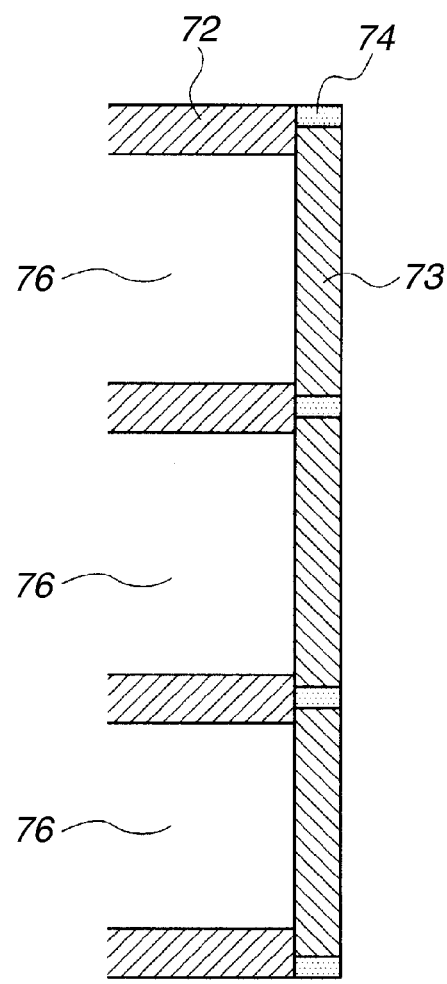
Figure 16A:
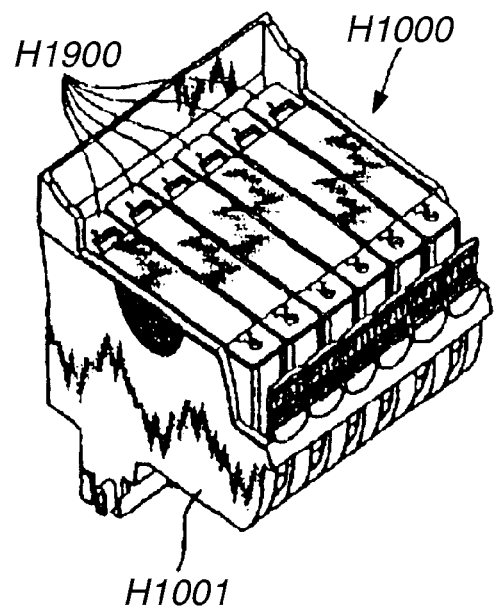
FIGS. 16A, 16B, and 16C are perspective views illustrating a conventional liquid jet recording head.
Figure 16B:
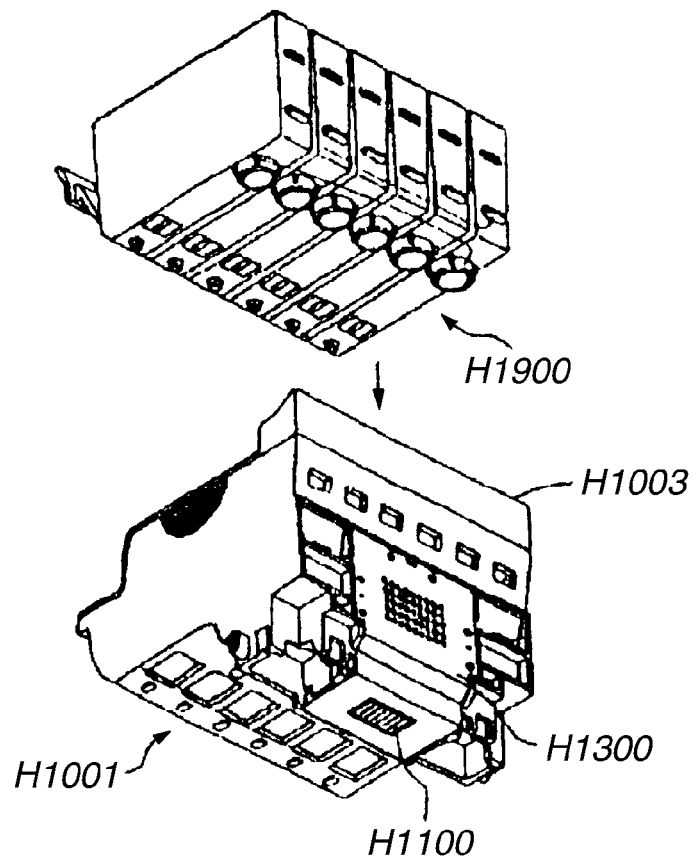
Figure 16C:
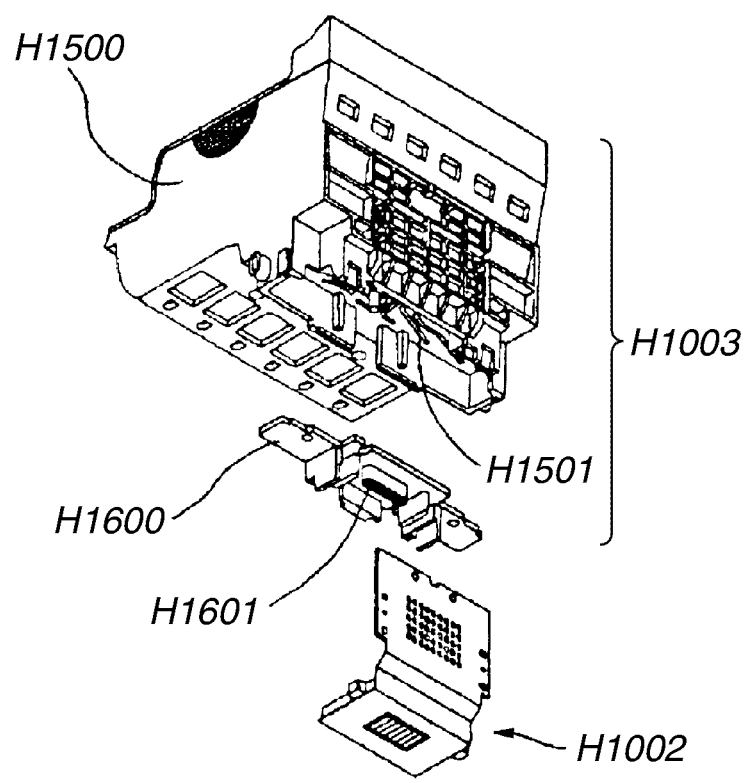
Figure 17A:
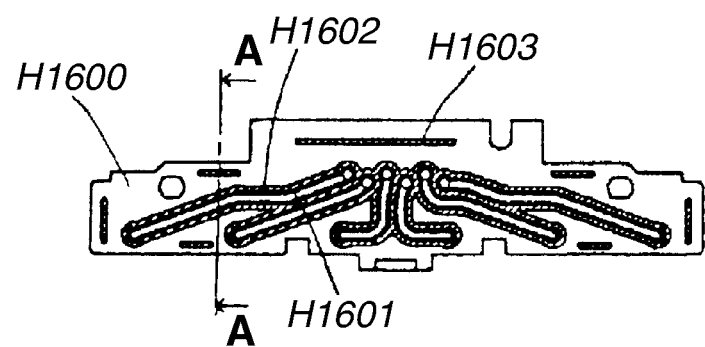
FIGS. 17A, 17B, 17C, and 17D illustrate welding portions of two members forming the conventional liquid jet recording head.
Figure 17B:
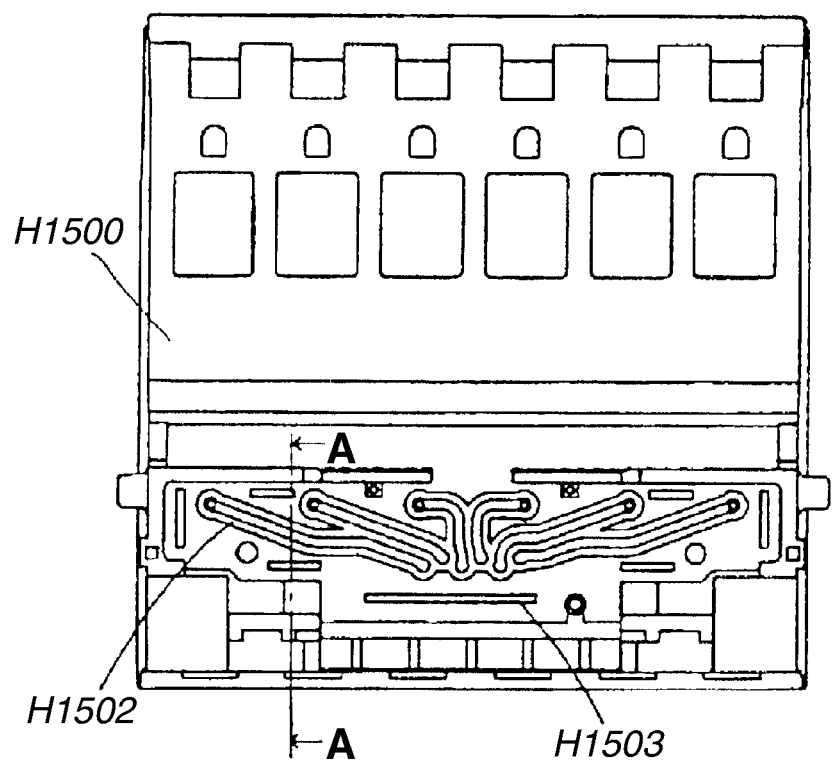
Figure 17C:
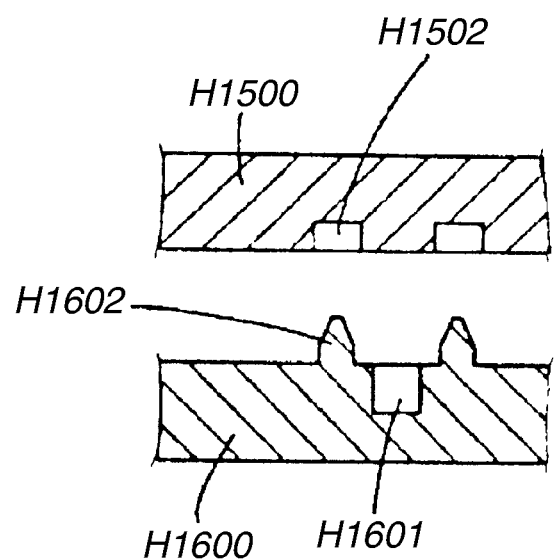
Figure 17D:
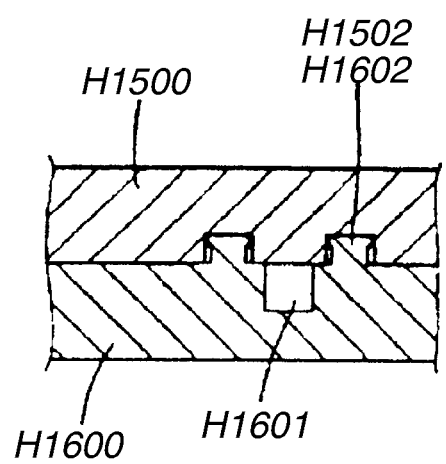
Figure 18A:
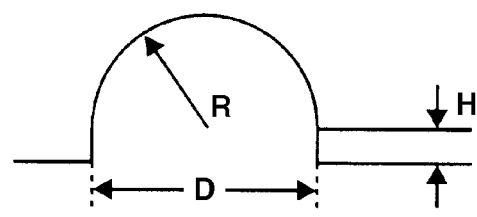
FIGS. 18A, 18B, 18C, and 18D illustrate a structure of a conventional flow path.
Figure 18B:
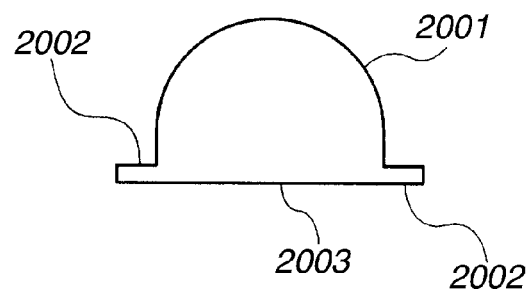
Figure 18C:
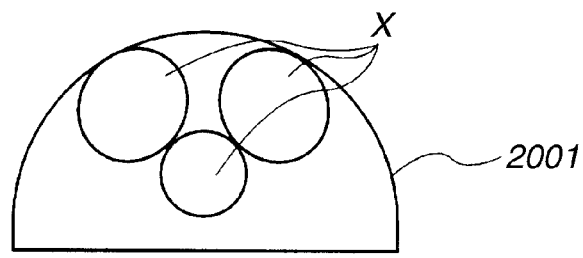
Figure 18D:
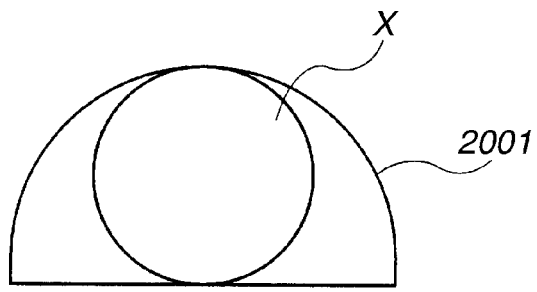

When the hollow portion 76 formed by closing the concave portion of the container with a flat shape member is configured to be successive, as illustrated in FIG. 15C, the bonding section between the hollow portions 76 can be shared such that the distance between the hollow portions 76 decreases, thereby arranging the hollow portions in high density.

The primary and second molded products can be molded by a known method such as the injection molding and the cutting. The primary and second molded products are secured at a predetermined position and the peripheries of the products are sealed to obtain a desired hollowed product.

Further, the bonding section can be manufactured by the injection mold. In this case, the primary and second molded products are molded by the primary molding and are bonded with each other by the second molding. The primary molding and the second molding can be performed by using each individual mold, or by using a single mold.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2009-001494 filed Jan. 7, 2009, which is hereby incorporated by reference herein in its entirety.

What is claimed is:

1. A liquid discharge head comprising:
a liquid discharge unit including a plurality of discharge ports for discharging liquid;
a liquid supply unit including a liquid supply path for supplying liquid to the liquid discharge unit;
the liquid supply unit comprising:
a first flow path forming member including a groove that forms a part of the liquid supply path and a concave portion formed along an opening edge of the groove and shallower in depth than the groove;
a second flow path forming member including a convex portion being in contact with a bottom surface of the concave portion and serving as a cap of the groove; and
a binding member that contacts the first flow path forming member and the second flow path forming member so as to bind the first flow path forming member and the second flow path forming member, the binding member being formed by injection molding.

2. The liquid discharge head according to claim 1, wherein the binding member contacts on a side surface of the convex portion and a surface of the first flow path forming member where the groove is formed.

3. The liquid discharge head according to claim 1, wherein the first flow path forming member is formed above the second flow path forming member while the liquid discharge head is being used.

* * * * *